United States Patent
Bross et al.

(10) Patent No.: US 12,126,804 B2
(45) Date of Patent: Oct. 22, 2024

(54) MULTIPLE STAGE RESIDUAL CODING IN MODERN HYBRID IMAGE AND VIDEO CODING SOLUTIONS

(71) Applicant: Fraunhofer-Gesellschaft zur Förderung der angewandten Forschung e.V., Munich (DE)

(72) Inventors: Benjamin Bross, Berlin (DE); Phan Hoang Tung Nguyen, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 241 days.

(21) Appl. No.: 17/698,549

(22) Filed: Mar. 18, 2022

(65) Prior Publication Data

US 2022/0210418 A1    Jun. 30, 2022

Related U.S. Application Data

(63) Continuation of application No. PCT/EP2020/076613, filed on Sep. 23, 2020.

(30) Foreign Application Priority Data

Sep. 24, 2019   (EP) .................................. 19199384

(51) Int. Cl.
*H04N 19/124*    (2014.01)
*H04N 19/13*    (2014.01)
(Continued)

(52) U.S. Cl.
CPC .......... *H04N 19/124* (2014.11); *H04N 19/13* (2014.11); *H04N 19/159* (2014.11);
(Continued)

(58) Field of Classification Search
None
See application file for complete search history.

(56) References Cited

U.S. PATENT DOCUMENTS

| | | | |
|---|---|---|---|
| 5,243,420 A | 9/1993 | Hibi | |
| 2004/0042549 A1* | 3/2004 | Huang | H04N 19/33 375/240.11 |

(Continued)

OTHER PUBLICATIONS

International Search Report and Written Opinion issued in application No. PCT/EP2020/076613.
(Continued)

*Primary Examiner* — Edemio Navas, Jr.
(74) *Attorney, Agent, or Firm* — McClure, Qualey & Rodack, LLP

(57) ABSTRACT

Decoder for decoding a residual signal from a data stream, configured to decode, from the data stream, a quantized prediction residual and at least one quantization error compensation signal; scale the quantized prediction residual to determine a scaled prediction residual; determine a reconstructed prediction residual based on the scaled prediction residual and the at least one quantization error compensation signal.

27 Claims, 12 Drawing Sheets

(51) Int. Cl.
*H04N 19/159* (2014.01)
*H04N 19/172* (2014.01)
*H04N 19/176* (2014.01)
*H04N 19/46* (2014.01)
*H04N 19/503* (2014.01)
*H04N 19/593* (2014.01)

(52) U.S. Cl.
CPC ......... *H04N 19/172* (2014.11); *H04N 19/176* (2014.11); *H04N 19/46* (2014.11); *H04N 19/503* (2014.11); *H04N 19/593* (2014.11)

(56) References Cited

U.S. PATENT DOCUMENTS

| | | | | |
|---|---|---|---|---|
| 2006/0067403 | A1* | 3/2006 | Sakai | H04N 19/176 375/E7.176 |
| 2009/0225833 | A1* | 9/2009 | Han | H04N 19/126 375/E7.243 |
| 2012/0213283 | A1* | 8/2012 | Ouedraogo | H04N 19/176 375/E7.123 |
| 2012/0301040 | A1* | 11/2012 | Yie | H04N 19/147 382/233 |
| 2013/0314496 | A1* | 11/2013 | Rossato | H04N 19/94 375/240.03 |
| 2014/0301462 | A1* | 10/2014 | Gu | H04N 19/176 375/240.12 |
| 2015/0016539 | A1* | 1/2015 | Hattori | H04N 19/119 375/240.24 |
| 2019/0045213 | A1* | 2/2019 | Raut | H04N 19/17 |
| 2019/0110053 | A1* | 4/2019 | Varia | H04N 19/12 |
| 2020/0068206 | A1* | 2/2020 | Hsiang | H04N 19/70 |
| 2020/0236349 | A1* | 7/2020 | Zhai | H04N 19/61 |
| 2020/0267388 | A1* | 8/2020 | Lainema | H04N 19/176 |
| 2021/0014481 | A1* | 1/2021 | Ichigaya | H04N 19/82 |

OTHER PUBLICATIONS

Wang, L., et al.; "Progressive Image Transmission by Transform Coefficient Residual Error Quantization;" IEEE Transactions on Communications; vol. 36; No. 1; Jan. 1988; pp. 75-87; http://dx.doi.org/10.1109/26.2731.

Nguyen, T., et al.; "Reduced-complexity entropy coding of transform coefficient levels using truncated golomb-rice codes in video compression;" Image Processing (ICIP), 2011 18th IEEE International Conference on, IEEE; 2011; pp. 753-756; http://dx.doi.org/10.1109/ICIP.2011.6116664.

Schwarz, H., et al.; "SNR scalable extension of H.264/AVC;" JVT Meeting; 67. MPEG Meeting; Joint Video Team of ISO/IEC JTC1/SC29/WG11 and ITU-T SG.16; Dec. 2003; pp. 1-20.

ITU-T; "Series H: Audiovisual and Multimedia Systems: Infrastructure of audiovisual services—Coding of moving video;" Recommendation H.265 and ISO/IEC, Int. Standard 23008-2, "High efficiency video coding," Feb. 2018; http://www.itu.int/rec/T-REC-H.265; pp. 1-692.

Nguyen, T., et al.; "Minimum Allowed QP for Transform Skip Mode;" Joint Video Experts Team (JVET) of ITU-T SG 16 WP 3 and ISO/IEC JTC 1/SC 29/WG 11; Jul. 2019; pp. 1-3.

Bross, B., et al.; "Non-CE8: Unified Transform Type Signalling and Residual Coding for Transform Skip;" Joint Video Experts Team (JVET) of ITU-T SG 16 WP 3 and ISO/IEC JTC 1/SC 29/WG 11; Jan. 2019; pp. 1-372.

* cited by examiner

MULTIPLE STAGE RESIDUAL CODING IN MODERN HYBRID IMAGE AND VIDEO CODING SOLUTIONS

CROSS-REFERENCE TO RELATED APPLICATIONS

This application is a continuation of copending International Application No. PCT/EP2020/076613, filed Sep. 23, 2020, which is incorporated herein by reference in its entirety, and additionally claims priority from European Application No. EP 19199384.9, filed Sep. 24, 2019, which is also incorporated herein by reference in its entirety.

Embodiments according to the invention related to Multiple stage residual coding in modern hybrid image and video coding solutions.

In the following description, different inventive embodiments and aspects will be described. Also, further embodiments will be defined by the enclosed claims.

It should be noted that any embodiments as defined by the claims can be supplemented by any of the details (features and functionalities) described in the following description.

Also, the embodiments described in the following description can be used individually, and can also be supplemented by any of the features in another aspect or embodiment, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in a video/picture encoder (apparatus for providing an encoded representation of an input video/picture signal) and in a video/picture decoder (apparatus for providing a decoded representation of a video/picture signal on the basis of an encoded representation). Thus, any of the features described herein can be used in the context of a video/picture encoder and in the context of a video/picture decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

BACKGROUND OF THE INVENTION

Modern image and video coding solutions such as High Efficiency Video Coding (HEVC, H.265, ISO/IEC 23008-3) and the currently developed Versatile Video Coding (VVC, H.266) allow to efficiently compress still or moving picture content even at very low bit-rates. The typical use case of these codec (coder-decoder) solutions is the lossy compression of high-resolution video material for broadcasting (e. g., television) and streaming (e. g., video-over-IP) applications. Nonetheless, the codecs also support loss-less compression, thus allowing mathematically perfect reconstruction of the coded input signals upon decoding. More specifically, HEVC provides several pulse code modulation (PCM) related coding tools with limited coding efficiency as well as a so-called transquant bypass coding mode, which facilitates more efficient lossless coding by simplifying the entropy coding process and by disabling the quantization, transform (DCT or DST), and deblocking steps. Details can be found in the HEVC syntax and decoding specification which is publicly available [1].

Recently, a contribution to the VVC standardization activity within JVET has been published [2], which corrects a particular lossless coding related shortcoming of the transform skip coding functionality in the current VVC draft, which also exists in HEVC and which specifies that, for a given coding subblock (CU or TU), the inverse residual coefficient transform operation (inverse DCT or DST) is bypassed. More specifically, the contribution proposes to restrict the quantization step-size, governed by a quantization parameter (QP), to a value greater than or equal to one (represented by a QP of 4) in case of activated transform skipping in a subblock. As a result, with a QP of 4 and disabled in-loop filtering in the spatial area covered by said subblock, lossless coding can be achieved when transform skipping is activated. This behavior, however, is identical to the use of the transform quantization bypass coding mode, as quantization with QP=4 (i. e., unity step-size) effectively represents the bypassing of the quantization algorithm.

FIG. 1b depicts a typical hybrid video encoder that also includes a decoder. For simplicity possible in-loop filtering blocks such as deblocking, adaptive loop filtering, which are applied to the reconstructed video before being added to the decoded picture buffer used for motion compensation, are omitted. Please note that for transform skip, the corresponding transform block is skipped and for lossless coding, the quantization is operated with a parameter that bypasses the quantization, e.g. the aforementioned QP=4. Furthermore, as described in [3], the residual coding can be adjusted to take the different signal characteristics of spatial residual signals for transform skip into account. Such a scheme is illustrated for an encoder in FIG. 1c showing a transform residual coding and transform skip residual coding. The corresponding decoder would apply transform skip residual decoding to the input bitstream followed by scaling or scaling with the factor of 1 for lossless.

In both cases, lossless and lossy coding, the entropy coding of the residual signal is done using residual coding that typically includes scanning the residual samples in smaller blocks or coefficient groups and coding of each sample using Context-Adaptive Binary Arithmetic Coding (CABAC). For lossy coding, the input to the residual coding would be either the quantized transform coefficient levels or, in case of transform skip, the quantized residual signal. For lossless, the input would be the unmodified residual signal. In residual coding, the input sample values are converted into a sequences of "0" and "1", the so called binarization. Each bin is then entropy coded with CABAC to generate the bitstream. In CABAC, context modelling is used to determine and adapt the probabilities of a bin being 0 or 1 in the arithmetic coding part, which increases the coding efficiency. The result is typically an input bin to output bit ratio less than 1.

Since the context derivation introduces computational complexity as well as dependencies of previously processed bins, only a limited number of bins is typically coded using context modelling. When that limit is reached, the bins are coded in a so called bypass mode which results in one bit in the bitstream per bin, i.e. a bin to bit ratio of 1. One way to increase the efficiency would be to use context modelling for more bins of a binarization. However, due to the statistics of the bins, applying context modelling to more bins can have limited effect and at some point do not increase the coding efficiency anymore.

SUMMARY

An embodiment may have a decoder for decoding a residual signal from a data stream, configured to decode, from the data stream, a quantized prediction residual and at least one quantization error compensation signal; scale the quantized prediction residual to determine a scaled prediction residual; determine a reconstructed prediction residual based on the scaled prediction residual and the at least one quantization error compensation signal.

Another embodiment may have an encoder for encoding a residual signal into a data stream, configured to quantize a prediction residual to determine, with a quantization error, a quantized prediction residual; determine at least one quantization error compensation signal for compensating the quantization error, encode, into the data stream, the quantized prediction residual and the at least one quantization error compensation signal.

According to another embodiment, a method for decoding a residual signal from a data stream may have the steps of: decoding, from the data stream, a quantized prediction residual and at least one quantization error compensation signal; scaling the quantized prediction residual to determine a scaled prediction residual; and determining a reconstructed prediction residual based on the scaled prediction residual and the at least one quantization error compensation signal.

According to another embodiment, a method for encoding a residual signal into a data stream may have the steps of: quantizing a prediction residual to determine, with a quantization error, a quantized prediction residual; determining at least one quantization error compensation signal for compensating the quantization error; encoding, into the data stream, the quantized prediction residual and the at least one quantization error compensation signal.

Another embodiment may have a data stream having a picture encoded thereinto using the inventive method of encoding.

In accordance with a first aspect of the present invention, the inventors of the present application realized that one problem encountered when trying to increase a coding efficiency using Context-Adaptive Binary Arithmetic Coding (CABAC) stems from the fact that applying context modelling to more bins of a binarization than typically, may only have limited effect and at some point may not increase the coding efficiency anymore. According to the first aspect of the present application, this difficulty is overcome by not only decoding/encoding from/into a data stream a quantized prediction residual, but also a quantization error compensation signal for the quantized prediction residual. The quantized prediction residual as well as the quantization error compensation signal can be coded using CABAC. The inventors found, that this approach results in at least two different binarizations of the residual signal, one for the quantized version and one for the quantization error compensation signal. This results in different distributions of bins in the residual coding stage for the quantized prediction residual and the residual coding stage for the quantization error compensation signal. This different distribution of bins can be exploited in context modelling. This is based on the idea that with the same number of context coded bins CABAC could better exploit statistical dependencies than in the case of only coding the prediction residual signal, resulting in an increased coding efficiency.

Accordingly, in accordance with a first aspect of the present application, a decoder for decoding a, e.g., lossless encoded, residual signal from a data stream, is configured to decode, from the data stream, a quantized prediction residual and at least one quantization error compensation signal, which quantization error compensation signal is optionally quantized. The quantization error compensation signal might compensate a quantization error, which quantization error is, for example, caused by a quantization of the prediction residual by the encoder and/or caused by a quantization of a prior quantization error by the encoder, wherein the prior quantization error might be caused by a quantization of the prediction residual. The quantization error is, for example, caused by a quantization step size used and set by an encoder. The decoder is configured to scale the quantized prediction residual to determine a scaled prediction residual. Optionally, the decoder is configured to scale a quantized quantization error compensation signal of the at least one quantization error compensation signal to determine a scaled quantization error compensation signal. The decoder, for example, is configured to scale the at least one quantized quantization error compensation signal to determine at least one scaled quantization error compensation signal. Furthermore, the decoder is configured to determine a reconstructed prediction residual based on the scaled prediction residual and the at least one, e.g., scaled, quantization error compensation signal. The decoder, e.g., is configured to sum the scaled prediction residual and the at least one scaled quantization error compensation signal to obtain the reconstructed prediction residual. Optionally the decoder is configured to perform a transform on the scaled prediction residual to obtain the reconstructed prediction residual.

Also in accordance with a first aspect of the present application, an encoder for encoding, e.g., lossless, a residual signal into a data stream, is configured to quantize a prediction residual to determine, with a quantization error, a quantized prediction residual and, for example, quantize at least one quantization error compensation signal to determine at least one quantized quantization error compensation signal. The encoder is configured to determine at least one quantization error compensation signal for compensating the quantization error, wherein the quantization error is, for example, caused by a quantization step size used and set by the encoder. The quantization error, for example, is caused by a quantization of the prediction residual by the encoder and/or caused by a quantization of a prior quantization error by the encoder, wherein the prior quantization error might be caused by a quantization of the prediction residual. Furthermore, the encoder is configured to encode, into the data stream, the quantized prediction residual and the at least one, optionally quantized, quantization error compensation signal.

According to an embodiment, the decoder/encoder is configured to decode/encode the quantized prediction residual and the at least one, optionally quantized, quantization error compensation signal from/into the data stream, using context-adaptive binary entropy decoding/encoding, e.g. context-adaptive binary arithmetic decoding/encoding, of a binarization of the prediction residual and of a binarization of the at least one quantization error compensation signal. The decoder/encoder, for example, might be configured to use the same binarizations for the prediction residual and the at least one quantization error compensation signal or different ones, i.e. might be configured to use different binarizations for the prediction residual and the at least one quantization error compensation signal.

According to an embodiment, the decoder/encoder is configured to use the context-adaptive binary entropy decoding/encoding to decode/encode leading bins of the binarization of the prediction residual context-adaptively and to use an equi-probability bypass mode to decode/encode remaining bins, i.e. bins following the leading bins, of the binarization of the prediction residual. Additionally or alternatively, the decoder/encoder is configured to use the context-adaptive binary entropy decoding/encoding to decode/encode leading bins of the binarization of the at least one quantization error compensation signal and to use an equi-probability bypass mode to decode/encode remaining bins of the binarization of the at least one quantization error compensation signal. Both, the prediction residual and the quantization error compensation signal, can be decoded/encoded the same way, wherein either an equal number of leading bins or a different number of leading bins can be chosen for the decoding/encoding. The decoder/encoder, e.g., decodes/encodes n leading bins with n being an integer greater than one, greater than two, smaller than five, smaller than four, in a range from two to ten, in a range from two to five or in a range from two to four.

According to an embodiment, the decoder/encoder is configured to use the same binarization for the prediction residual and the at least one quantization error compensation signal and use first probability models for the decoding/encoding of the leading bins of the binarization of the prediction residual and second probability models for the decoding/encoding of the leading bins of the at least one quantization error compensation signal. It was found, that a coding efficiency can be increased, if the leading bins of the binarization of the prediction residual are coded using a different context than for the coding of the leading bins of the quantization error compensation signal.

According to an embodiment, the decoder/encoder is configured to use the same binarization for the prediction residual and the at least one quantization error compensation signal and select, for the decoding/encoding of a predetermined bin, e.g., a first bin such as a significance bin, of the leading bins of the binarization of the prediction residual, a first probability model out of a first set of probability models based on a function applied to previously decoded/encoded bins of the binarization of the prediction residual and, for the decoding/encoding of a predetermined bin, e.g., a first bin such as a significance bin, of the leading bins of the binarization of the at least one quantization error compensation signal, a second probability model out of a second set of probability models based on a the function applied to previously decoded/encoded bins of the binarization of the at least one quantization error compensation signal. For example, the same number of contexts are used, but different ones. In other words, the first set of probability models and the second set of probability models may have the same number of probability models but might comprise different probability models. Furthermore, for the binarization of the prediction residual and for the binarization of the quantization error compensation signal the same function might be selected, for selecting one of the, e.g., different, contexts for a certain bin, based on previously decoded/encoded bins of that signal.

According to an embodiment, the decoder/encoder is configured to decode/encode, from/into the data stream, two or more quantization error compensation signals. At least a first quantization error compensation signal represents a first quantized quantization error compensation signal and wherein the first quantization error compensation signal is associated with a quantization error caused by a quantization of the prediction residual. The first quantization error compensation signal can be used to compensate the quantization error caused by the quantization of the prediction residual. A second quantization error compensation signal is associated with a quantization error caused by a quantization of the first quantization error compensation signal. The second quantization error compensation signal can be used to compensate the quantization error caused by the quantization of the first quantization error compensation signal. It is to ne noted, that the decoder/encoder might be configured to directly decode/encode the second quantization error compensation signal without subjecting the second quantization error compensation signal to a scaling/quantization. This would enable a lossless coding. Alternatively, the second quantization error compensation signal might represent a second quantized quantization error compensation signal. Only in case of lossless compensation of a quantization error caused by a quantization of the second quantization error compensation signal a lossless coding might be possible, otherwise this represents a lossy coding. An n-th (e.g., for $n \geq 2$) quantization error compensation signal is associated with a quantization error caused by a quantization of the (n−1)th quantization error compensation signal. The first quantization error compensation signal might represent a subtraction of a quantized prediction residual from an original prediction residual, optionally from a transformed prediction residual, and the one or more following quantization error compensation signals, e.g., an n-th (e.g., for $n \geq 2$) quantization error compensation signal, might represent a subtraction of a previously quantized prior-quantization error compensation signal from the respective prior-quantization error compensation signal before the quantization, wherein the prior-quantization error compensation signal might represent an (n−1)th quantization error compensation signal.

According to an embodiment, the decoder is configured to scale the first quantized quantization error compensation signal to obtain a first scaled quantization error compensation signal and determine the reconstructed prediction residual based on the scaled prediction residual, the first scaled quantization error compensation signal and the second quantization error compensation signal. Parallel to the decoder, the encoder is configured to quantize the first quantization error compensation signal to obtain a first quantized quantization error compensation signal, such that a reconstructed prediction residual is determinable by a decoder based on the quantized prediction residual, the first quantized quantization error compensation signal and the second quantization error compensation signal. If two quantization error compensation signals are decoded/encoded from/into the data stream, the second quantization error compensation signal, e.g., is not quantized, i.e. does not represent a quantized quantization error compensation signal, for lossless decoding/encoding. If more than two quantization error compensation signals are decoded/encoded from/into the data stream only the last quantization error compensation signal is not quantized, i.e. does not represent a quantized quantization error compensation signal, and the prior quantization error compensation signals are quantized i.e. represent a quantized quantization error compensation signal. Thus, a lossless decoding/encoding can be realized. The quantization error compensation signals, for example, are ordered in the order in which they are determined by the encoder or signaled in the data stream. According to an embodiment, for lossy decoding/encoding all decoded/encoded quantization error compensation signals represent quantized quantization error compensation signals.

For a plurality of quantization error compensation signals, e.g., for m quantization error compensation signals with m≥3, the decoder is configured to determine a reconstructed quantization error compensation signal by combining the last two quantization error compensation signals to an intermediate reconstructed quantization error compensation signal, wherein at least one of the two quantization error compensation signals is scaled, e.g. the last quantization error compensation signal might not be scaled. Furthermore, the decoder is configured to determine the reconstructed quantization error compensation signal by combining the intermediate reconstructed quantization error compensation signal with a prior scaled quantization error compensation signal to obtain a new intermediate reconstructed quantization error compensation signal and to perform this last type of combination in a cascading way from a (m−2)th scaled quantization error compensation signal to the first scaled quantization error compensation signal. In other words, the decoder might be configured to determine a (m−1)th intermediate reconstructed quantization error compensation signal based on a m-th (e.g., scaled) quantization error compensation signal and a (m−1)th scaled quantization error compensation signal and determine the following intermediate reconstructed quantization error compensation signals based on the respective prior intermediate reconstructed quantization error compensation signal and the current quantization error compensation signal. For example, a (m−2)th intermediate reconstructed quantization error compensation signal is based on a (m−2)th scaled quantization error compensation signal and a (m−1)th intermediate reconstructed quantization error compensation signal.

According to an embodiment, the decoder is configured to decode, from the data stream, a first scaling parameter for a scaling of the quantized prediction residual, and further scaling parameters for scalings of quantized quantization error compensation signals, e.g., like the first quantized quantization error compensation signal. The scaling of the quantized prediction residual and the scaling of the quantized quantization error compensation signals is performed at the decoder side, the encoder encodes the corresponding first and further scaling parameters into the data stream. Each scaling parameter of the further scaling parameters is associated with a quantization stage, e.g., in which the quantization error is caused. The quantization stages are, for example, ordered according to an order in which the quantization errors are caused by an encoder or signaled in the data stream. The first scaling parameter is associated with the first quantization stage.

According to an embodiment, the decoder/encoder is configured to decode/encode each of the further scaling parameters, from/into the data stream, or decode/encode an offset for each of the further scaling parameters to a scaling parameter associated with a previous quantization stage at video, picture sequence, picture or sub-picture granularity, e.g., per slice or per tile or per coding block. With this coding a bit stream and thus a signalization cost can be reduced.

According to an embodiment, the decoder/encoder is configured to decode/encode, from/into the data stream, a first scaling parameter for the scaling of the quantized prediction residual and a second scaling parameter for a scaling of the at least one quantization error compensation signal. The second scaling parameter might be usable for a scaling of each quantization error compensation signal of the at least one quantization error compensation signal.

According to an embodiment, the decoder/encoder is configured to decode/encode the second scaling parameter as an offset to the first scaling parameter, whereby the coding efficiency can be increased and a bit stream and thus a signalization cost can be reduced.

According to an embodiment, the decoder/encoder is configured to decode/encode the second scaling parameter or an offset of the second scaling parameter to the first scaling parameter at video, picture sequence, picture or sub-picture granularity, e.g., per slice or per tile or per coding block.

According to an embodiment, the decoder/encoder is configured to leave a predetermined quantization error compensation signal of the at least one quantization error compensation signals unscaled, thereby forming a lossless reconstruction of a lossless coded prediction residual. The predetermined quantization error compensation signal, for example, is a last quantization error compensation signal, wherein the first quantization error compensation signal is associated with a quantization error caused by a quantization of the prediction residual. If the prediction residual and one quantization error or a quantization error compensation signal is decoded/encoded from/into the data stream, this decoded/encoded quantization error or quantization error compensation signal is an unquantized version and is not to be scaled by the decoder. If the prediction residual and three quantization errors or three quantization error compensation signals are decoded/encoded from/into the data stream, a first and a second decoded quantization error or quantization error compensation signal are a quantized version and have to be scaled by the decoder and a third decoded/encoded quantization error is in an unquantized version (no scaling by the decoder is needed).

According to an embodiment, the residual signal, i.e. the prediction residual, corresponds to a prediction of a picture or a video. The decoder/encoder is configured to detect/determine a lossless coding mode for first portions and a lossy coding mode for second portions of the picture or video. For the first portions, the encoder, for example, is configured to quantize the prediction residual using a predetermined quantizing factor to determine the quantized prediction residual and leave the at least one quantization error compensation signal unquantized. The quantizing factor can herein correspond to an inverse scaling factor. The encoder might be configured to either encode the quantizing factor or the scaling factor. The encoder might be configured to encode, into the data stream, the quantized prediction residual and the at least one quantization error compensation signal, e.g., one quantization error compensation signal. The decoder might be configured to decode, from the data stream, the quantized prediction residual and the at least one quantization error compensation signal, e.g. the one quantization error compensation signal, and scale the quantized prediction residual using the predetermined scaling factor to determine the scaled prediction residual, and leave the at least one quantization error compensation signal unscaled. The decoder might be configured to determine the reconstructed prediction residual based on the scaled prediction residual and the at least one quantization error compensation signal. For the second portions, the encoder might be configured to quantize the prediction residual using a first quantizing factor to be signaled, e.g., as the first scaling factor, in the data stream for the second portions to determine the quantized prediction residual, and encode, into the data stream, the quantized prediction residual without the at least one quantization error compensation signal. The decoder might, for the second portions, be configured to decode, from the data stream, the quantized prediction residual without the at least one quantization error compensation signal; and scale the quantized prediction residual using the first scaling factor signaled in the data stream for the second portions to determine the scaled prediction residual to obtain the reconstructed prediction residual. If a transform-skip mode is detected by the decoder the scaled prediction residual might represents the reconstructed prediction residual and if a transform mode is detected by the decoder the scaled prediction residual might be transformed by the decoder to determine the reconstructed prediction residual.

According to an embodiment, the decoder/encoder is configured to decode/encode from/into the data stream a lossless/lossy coding mode flag for portions of the picture or video. The decoder is configured to identify portions for which the lossless/lossy coding mode flag indicates the lossless coding mode as the first portions, and portions for which the lossless/lossy coding mode flag indicates the lossy coding mode as the second portions.

According to an embodiment, the decoder/encoder is configured to decode/encode from/into the data stream the first scaling factor, i.e. the first quantizing factor, for portions of the picture or video. The first scaling factor can be associated with an inverse of the first quantization factor. The first scaling factor is also decoded, if only the first quantizing factor is present in the data stream, since both factors are directly related to each other and the decoder can obtain the scaling factor from the first quantization factor. The decoder might identify portions for which the first scaling factor corresponds to no scaling as the first portions, and portions for which the first scaling factor does not correspond to no scaling as the second portions.

According to an embodiment, the decoder/encoder is configured to use a fixed, e.g., default, predetermined scaling factor/quantizing factor or obtain the predetermined scaling factor/quantizing factor by applying an offset to the first scaling factor/quantizing factor. Alternatively, the decoder might be configured to decode the predetermined scaling factor/quantizing factor from the data stream and the encoder might be configured to determine the predetermined scaling factor/quantizing factor individually. The offset, for example, is set by the decoder/encoder or set by default or decoded from the data stream by the decoder.

According to an embodiment, the decoder/encoder is configured to decode/encode from/into the data stream for portions, e.g. for the first portions as well as for the second portions, the first scaling factor and an indication whether the residual signal is coded into the data stream in transform domain or non-transform domain. The decoder is configured to identify portions for which the first scaling factor corresponds to no scaling and the residual signal is coded into the data stream in the non-transform domain as the first portions, and portions for which the first scaling factor does not correspond to no scaling and the residual signal is coded into the data stream in transform domain as the second portions. The first case, i.e. no scaling of the residual signal and the residual signal coded in the non-transform domain, may correspond to a transform skip mode or transform quantization bypass coding mode.

According to an embodiment, the decoder/encoder is configured to predict the picture using intra prediction and/or inter prediction so as to obtain a prediction signal. The encoder might be configured to determine the prediction residual for a predetermined block of the picture based on the prediction signal and an original signal related to the predetermined block of the picture, e.g., by subtracting the prediction signal from the original signal. The, on the decoder side, reconstructed prediction residual relates to the prediction signal of the picture within a predetermined block of the picture and the decoder is configured to reconstruct the predetermined block of the picture using the reconstructed prediction residual and the prediction signal, e.g., by adding the prediction signal to the reconstructed prediction residual.

According to an embodiment, the decoder/encoder is configured to decode/encode the at least one (optionally quantized) quantization error compensation signal using spatial and/or temporal prediction.

According to an embodiment, the decoder/encoder is configured to decode/encode the at least one (optionally quantized) quantization error compensation signal using spatial and/or temporal prediction from neighboring and/or previously decoded/encoded portions of the at least one (optionally quantized) quantization error compensation signal.

According to an embodiment, the encoder is configured to obtain at least one prediction error of a quantization error, using at least one error prediction signal using a prediction type. The at least one prediction error might be determined based on the at least one error prediction signal and the at least one quantization error. The encoder might be configured to encode, into the data stream, the at least one prediction error of a quantization error and an assignment of the at least one prediction error of a quantization error to a set of prediction types, so that each prediction error of a quantization error is assigned to an associated prediction type out of the set of prediction types. The decoder is configured to decode, from the data stream, at least one prediction error of a quantization error and derive, from the data stream, an assignment of the at least one prediction error of a quantization error to a set of prediction types, so that each prediction error of a quantization error is assigned to an associated prediction type out of the set of prediction types. Additionally, the decoder might be configured to obtain, for the at least one prediction error of a quantization error, at least one error prediction signal using the prediction type assigned to the respective prediction error of a quantization error, and determine the at least one quantization error compensation signal based on the at least one prediction error of a quantization error and the at least one error prediction signal.

According to an embodiment, the decoder/encoder is configured to decode/encode the quantized prediction residual from/into a lossy base layer of the data stream and decode/encode the at least one quantization error compensation signal from/into an enhancement layer of the data stream.

An embodiment is related to a method for decoding a residual signal from a data stream, comprising decoding, from the data stream, a quantized prediction residual and at least one quantization error compensation signal; scaling the quantized prediction residual to determine a scaled prediction residual; and determining a reconstructed prediction residual based on the scaled prediction residual and the at least one quantization error compensation signal.

An embodiment is related to a method for encoding a residual signal into a data stream, comprising quantizing a prediction residual to determine, with a quantization error, a quantized prediction residual; determining at least one quantization error compensation signal for compensating the quantization error encoding, into the data stream, the quantized prediction residual and the at least one quantization error compensation signal.

The methods as described above are based on the same considerations as the above-described encoder or decoder.

The method can, by the way, be completed with all features and functionalities, which are also described with regard to the encoder or decoder.

An embodiment is related to a data stream having a picture or a video encoded thereinto using a herein described method for encoding.

An embodiment is related to a computer program having a program code for performing, when running on a computer, a herein described method.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
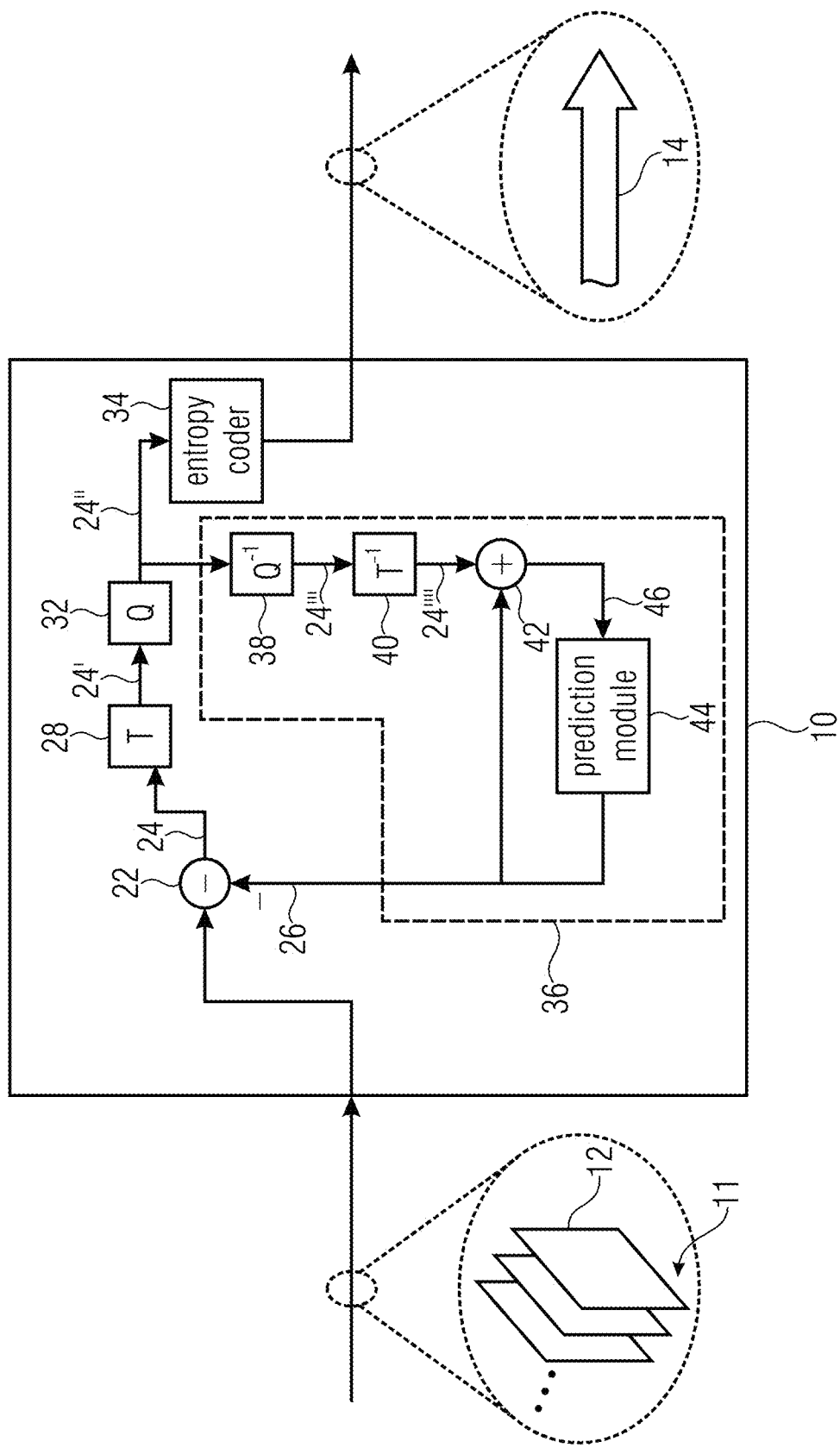
FIG. 1a shows a schematic view of an encoder.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1a to 3. The before described embodiments of the concept of the present invention could be built into the encoder and decoder of FIGS. 1a, 1b and 2, respectively, although the embodiments described with the FIGS. 4a to 8, may also be used to form encoders and decoders not operating according to the coding framework underlying the encoder and decoder of FIGS. 1a, 1b and 2.

Figure 1B:
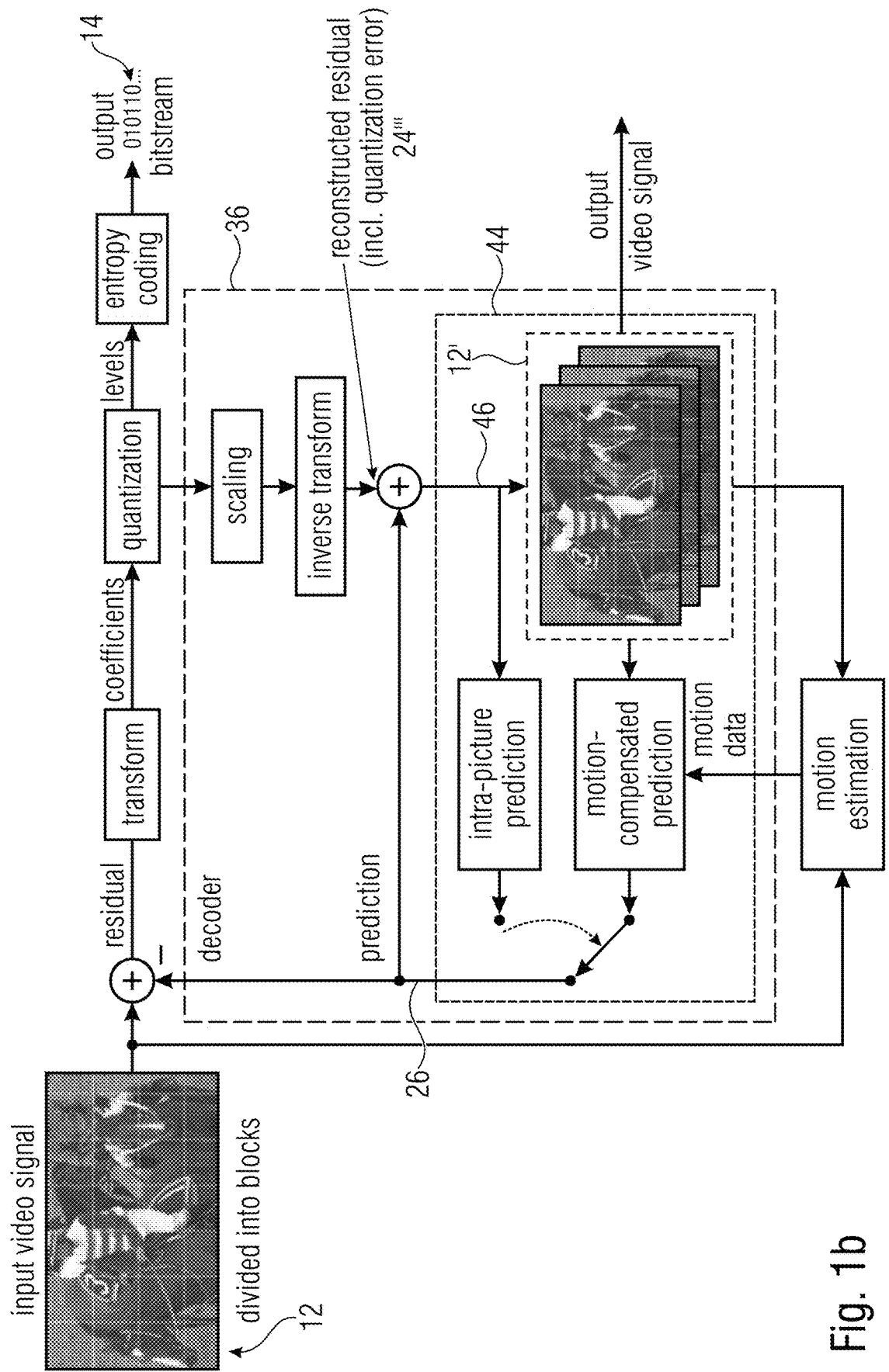
FIG. 1b shows a schematic view of an alternative encoder.
Figure 1C:
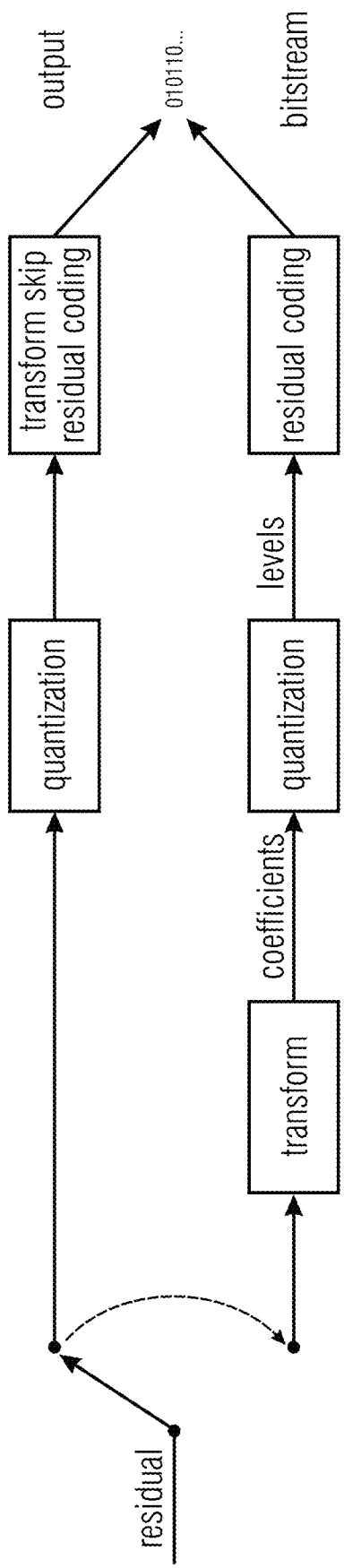
FIG. 1c shows a schematic view of a residual coding.
Figure 2:
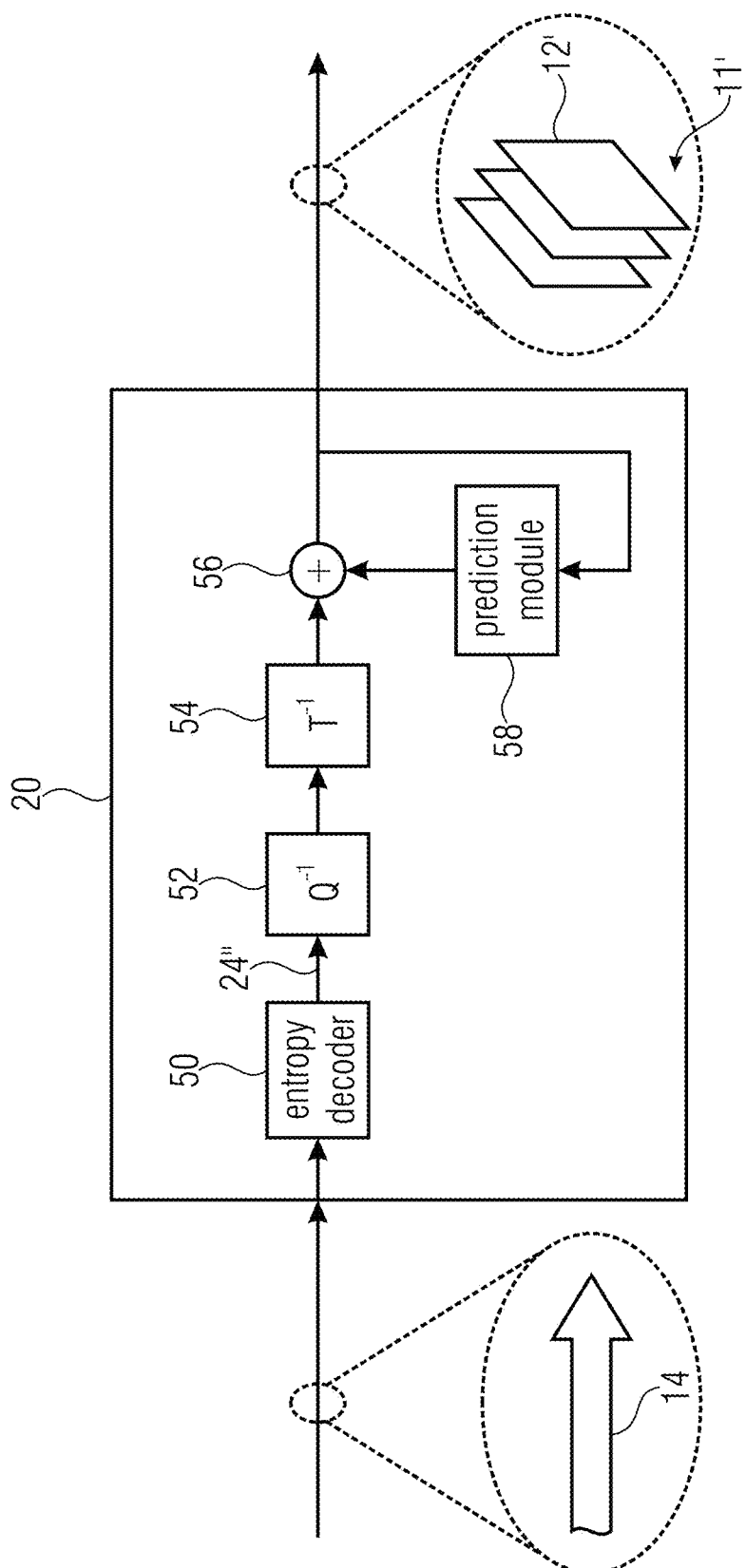
FIG. 2 shows a schematic view of a decoder.

FIG. 1a shows an apparatus (e. g. a video encoder and/or a picture encoder) for predictively coding a picture 12 into a data stream 14 exemplarily using transform-based residual coding. The apparatus, or encoder, is indicated using reference sign 10. FIG. 1b shows also the apparatus for predictively coding a picture 12 into a data stream 14, wherein a possible prediction module 44 is shown in more detail. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1a, 1b and FIG. 2 exemplarily use transform based prediction residual coding, although embodiments of the present application are not restricted to this kind of prediction residual coding. This is true for other details described with respect to FIGS. 1a, 1b and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal, thus obtained, to spectral-to-spatial transformation.

Internally, the encoder 10 may comprise a prediction residual signal former 22 which generates a prediction residual 24 so as to measure a deviation of a prediction signal 26 from the original signal, i.e. from the picture 12, wherein the prediction signal 26 can be interpreted as a linear combination of a set of one or more predictor blocks according to an embodiment of the present invention. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14.

The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1a, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. motion-compensated prediction, i.e. inter-picture prediction, as shown in FIG. 1*b* in more detail.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24'' from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and intercoding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded.

Intra-coded blocks are predicted on the basis of a spatial, already coded/decoded neighborhood (e. g. a current template) of the respective block (e. g. a current block) as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intracoded block with driving tilt and offset of the plane defined by the two-dimensional linear function on the basis of the neighboring samples.

Compared thereto, inter-coded blocks may be predicted, for instance, temporally. For inter-coded blocks, motion vectors may be signaled within the data stream 14, the motion vectors indicating the spatial displacement of the portion of a previously coded picture (e. g. a reference picture) of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
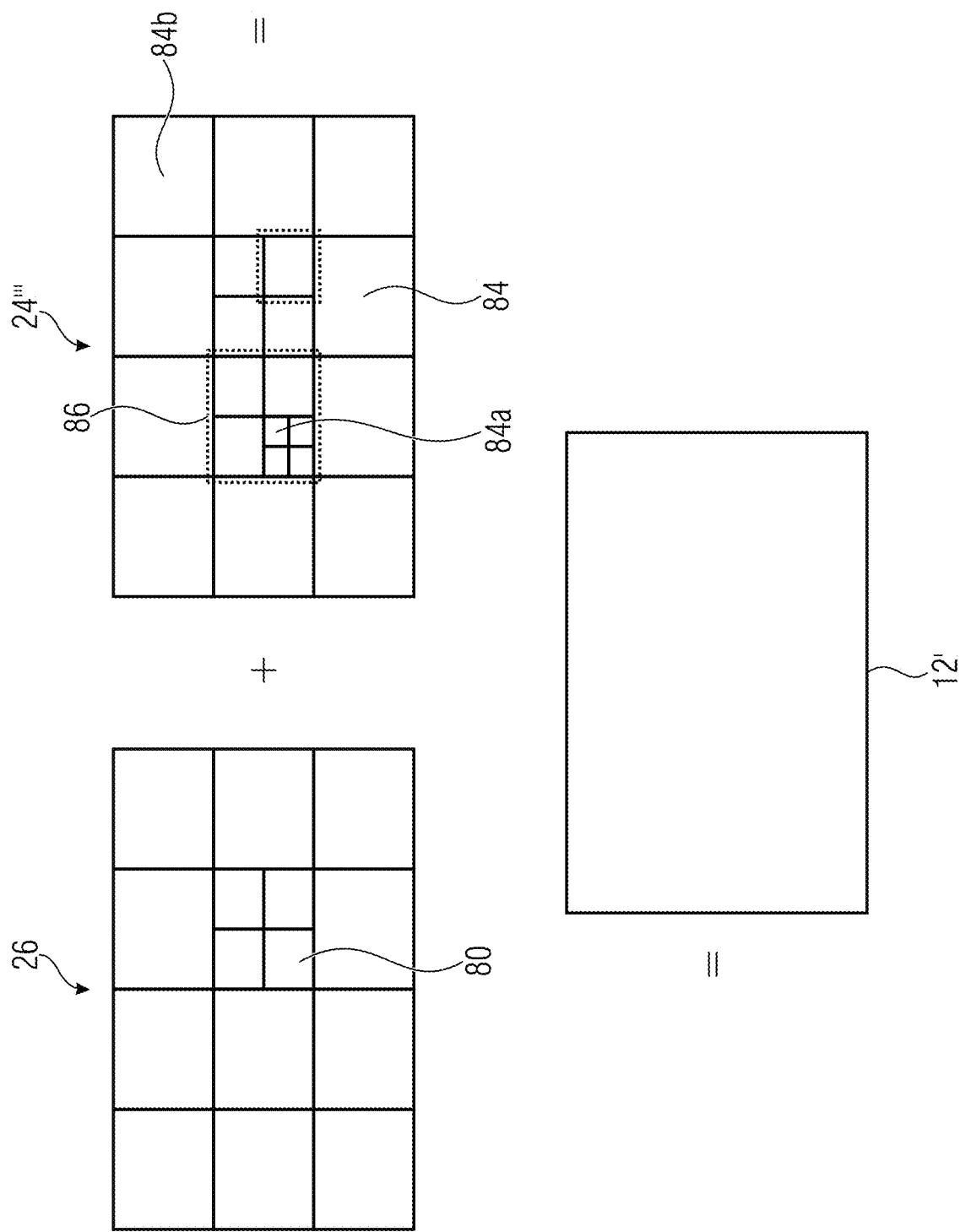
FIG. 3 shows a schematic view of a block-based coding.

FIG. 3 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST (discrete sine transform) or DCT (discrete cosine transform) for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform, but it is also possible, that no transform is used by the encoder or decoder at all or for single blocks 80, 82, 84.

As already outlined above, FIGS. 1a to 3 have been presented as an example where the inventive concept described before may be implemented in order to form specific examples for encoders and decoders according to the present application. Insofar, the encoder and decoder of FIGS. 1a, 1b and 2, respectively, may represent possible implementations of the encoders and decoders described herein before. FIGS. 1a, 1b and 2 are, however, only examples. An encoder according to embodiments of the present application may, however, be different from the encoder of FIG. 1a or 1b such as, for instance, in that the sub-division into blocks 80 is performed in a manner different than exemplified in FIG. 3 and/or in that no transform (e.g. transform skip/identity transform) is used at all or for single blocks. Likewise, decoders according to embodiments of the present application may differ, for instance, from the decoder 20 of FIG. 2 in that same sub-divides picture 12' into blocks in a manner different than described with respect to FIG. 3 and/or in that same does not derive the prediction residual from the data stream 14 in transform domain, but in spatial domain, for instance and/or in that same does not use any transform at all or for single blocks.

The binarization mentioned herein with respect to values |q|, e.g., samples/coefficients, of the prediction residual and the at least one (optionally quantized) quantization error compensation signal may be as shown in table 1:

TABLE 1

| |q| | sig | gt1 | par | gt3 | rem |
|---|---|---|---|---|---|
| 0 | 0 | — | — | — | — |
| 1 | 1 | 0 | — | — | — |
| 2 | 1 | 1 | 0 | 0 | — |
| 3 | 1 | 1 | 1 | 0 | — |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| 12 | 1 | 1 | 0 | 1 | 4 |
| 13 | 1 | 1 | 1 | 1 | 4 |
| 14 | 1 | 1 | 0 | 1 | 5 |
| 15 | 1 | 1 | 1 | 1 | 5 |
| ... | ... | ... | ... | ... | ... | possible binarization

The remainder value rem is binarized as well, i.e. split into a sequece of 0s and 1s, e.g. by using a Golomb Rice Code or the like.

According to an embodiment the inventive concept described hereinafter can be implemented in the quantizer 32 of the encoder or in the dequantizer 38, 52 of the decoder. According to an embodiment thus the quantizer 32 and/or the dequantizer 38, 52 can comprise multiple quantization stages or scaling stages.

Figure 4A:
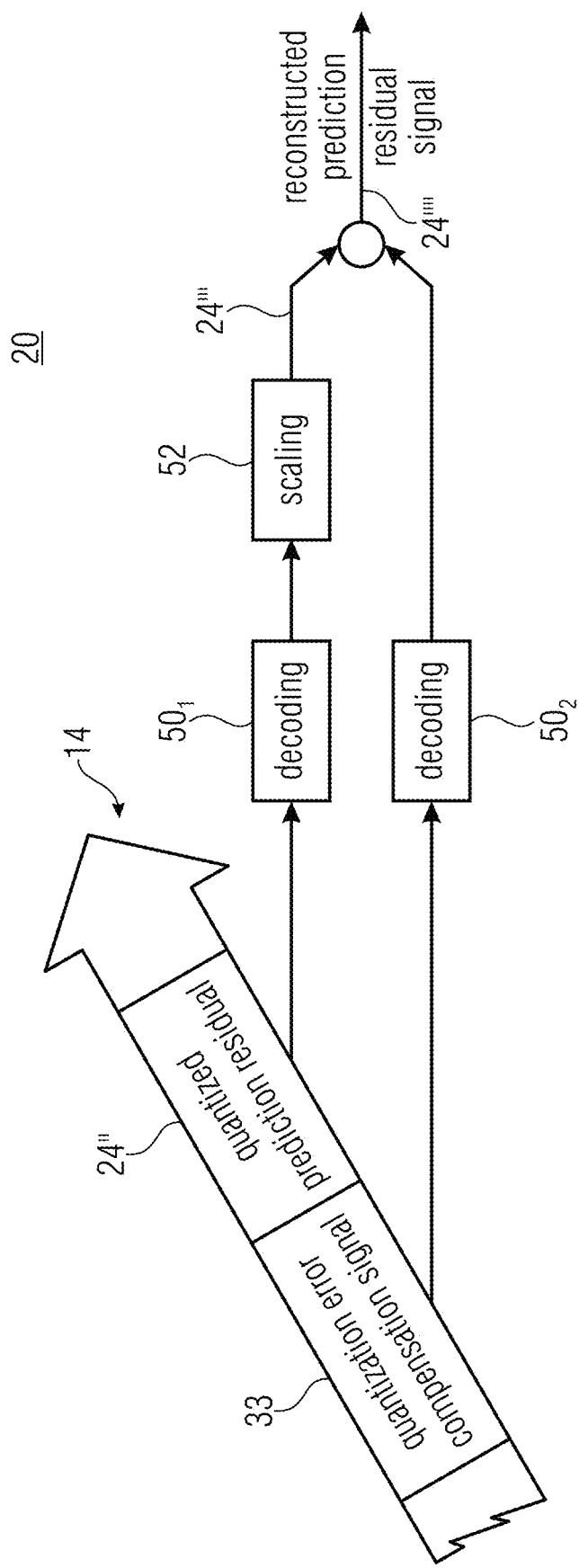
FIG. 4a shows a schematic view of an encoder, according to an embodiment.
Figure 4B:
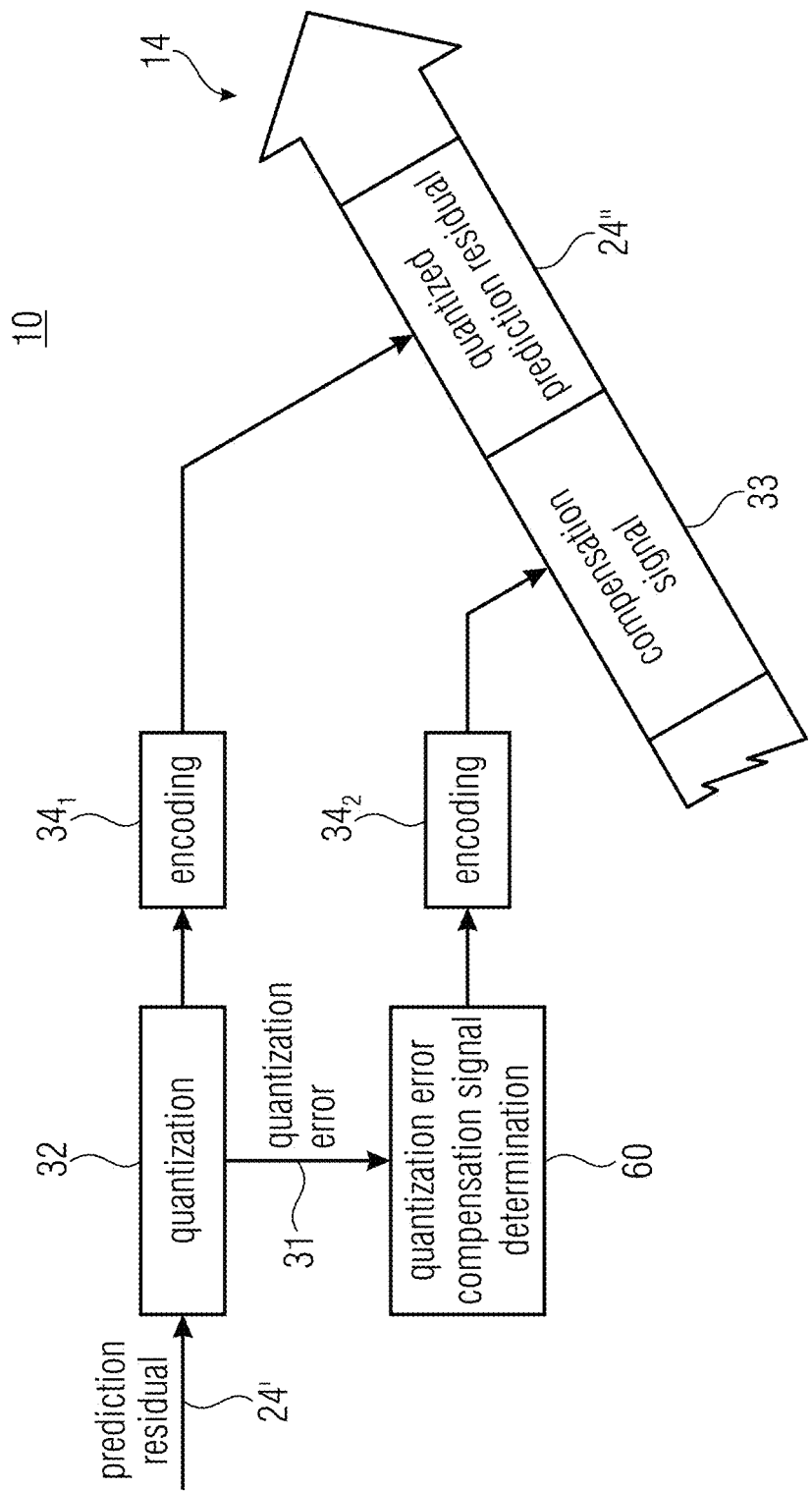
FIG. 4b shows a schematic view of a decoder, according to an embodiment.

FIG. 4a shows a decoder and FIG. 4b shows an encoder, according to a first aspect of the present invention.

The decoder 20 for decoding a residual signal from a data stream 14, is configured to decode 50, from the data stream 14, a quantized prediction residual 24'' and at least one quantization error compensation signal 33. Additionally, the decoder 20 is configured to scale 52, i.e. dequantize, the quantized prediction residual 24'' to determine a scaled prediction residual 24'''. The decoder is configured to determine a reconstructed prediction residual 24'''' based on the scaled prediction residual 24''' and the at least one quantization error compensation signal 33.

Parallel to the decoder 20, shown in FIG. 4a, the encoder 10, shown in FIG. 4b, for encoding a residual signal into a data stream 14, is configured to quantize 32 a prediction residual 24' to determine, with a quantization error 31, a quantized prediction residual 24''. Additionally, the encoder 10 is configured to determine 60 at least one quantization error compensation signal 33 for compensating the quantization error 31. The encoder 10 is configured to encode 34, into the data stream 14, the quantized prediction residual 24'' and the at least one quantization error compensation signal 33.

Figure 6A:
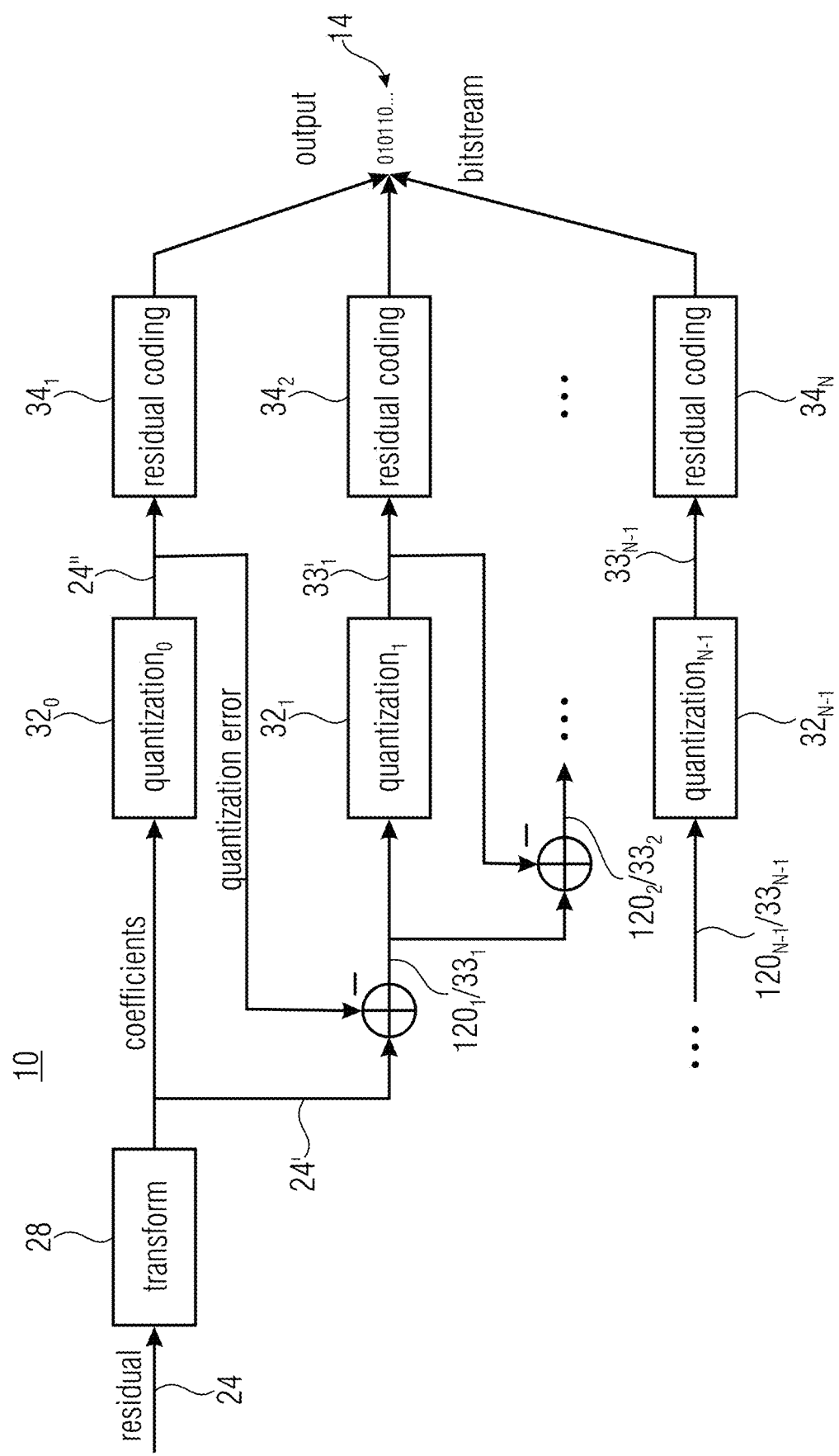
FIG. 6a shows a schematic view of an encoder with a multiple stage residual coding, according to an embodiment.
Figure 6B:
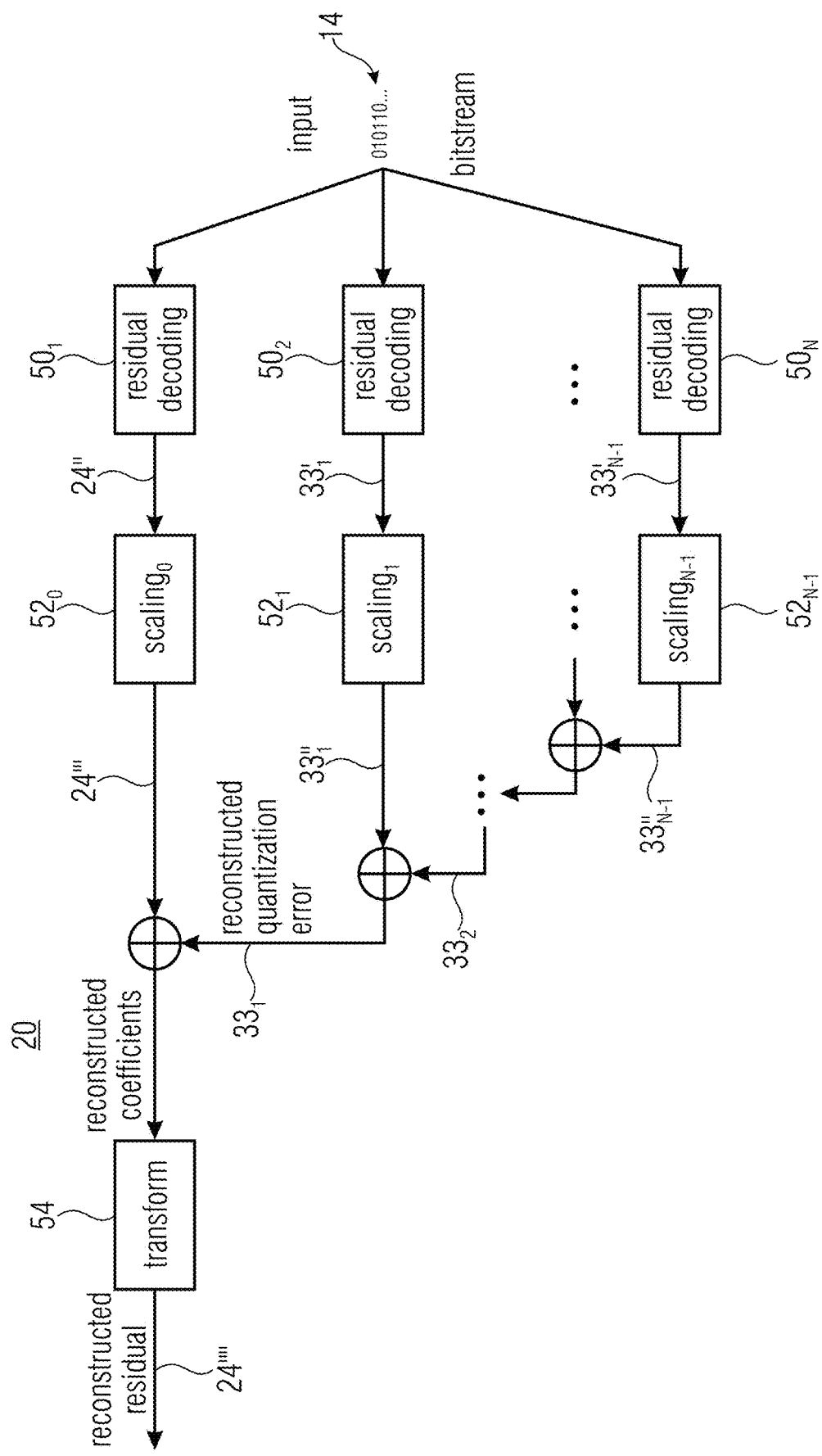
FIG. 6b shows a schematic view of a decoder with a multiple stage residual coding, according to an embodiment.
Figure 7A:
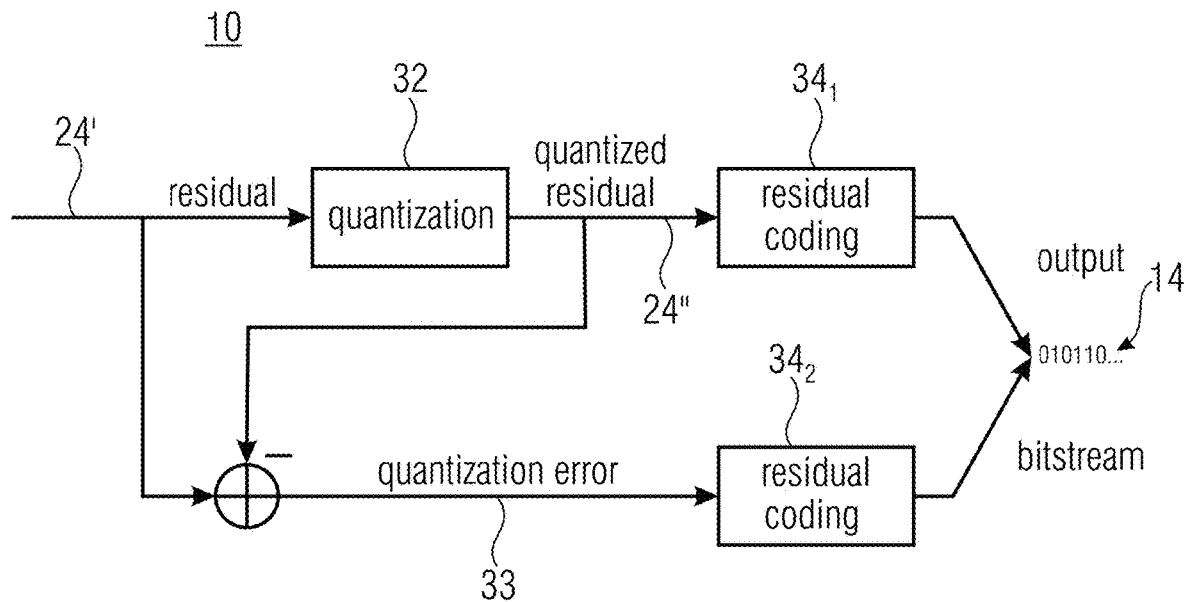
FIG. 7a shows a schematic view of an encoder with a two stage residual coding, according to an embodiment.
Figure 7B:
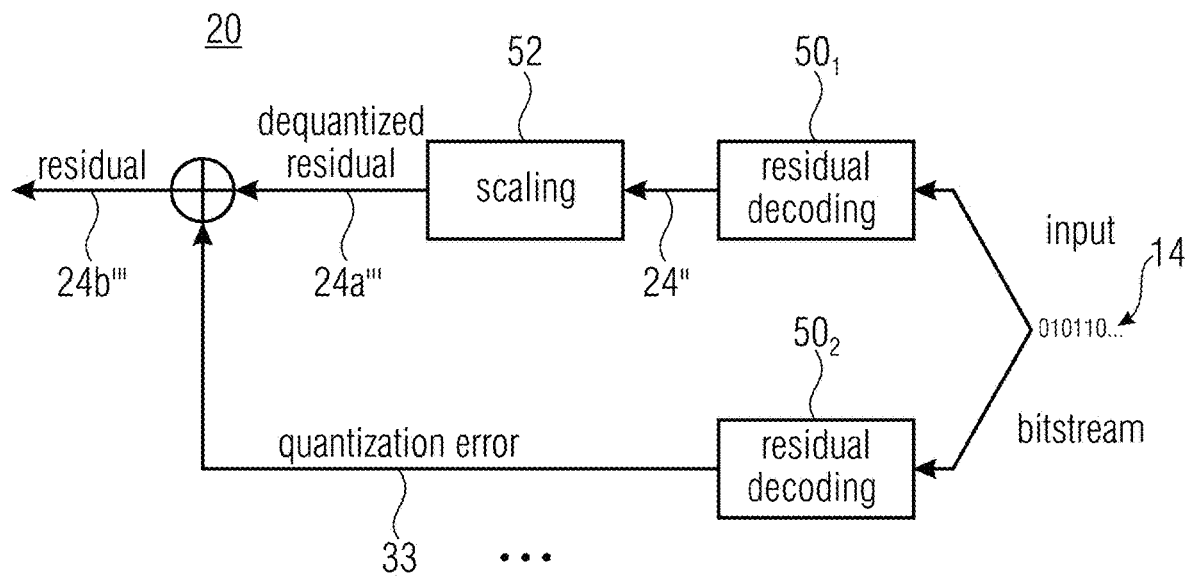
FIG. 7b shows a schematic view of a decoder with a two stage residual coding, according to an embodiment.

The at least one quantization error compensation signal 33 might represent a quantization error, see for example FIG. 7a and FIG. 7b, or a quantized/scaled quantization error, see for example FIG. 6a and FIG. 6b.

The present invention uses, according to an embodiment, multiple stages of residual coding, e.g. two stages, with a first stage corresponding to the coding of the quantized prediction residual 24" and a second stage corresponding to the coding of the quantization error compensation signal 33. In addition to the regular residual coding of a quantized residual 24", the quantization error, i.e. the quantization error compensation signal 33, can be fed into another residual coding or the quantization error can be quantized again and fed into another residual coding. The quantization error of this quantized quantization error can be quantized and residual coded again and so on, as shown in the embodiment of FIG. 6a and FIG. 6b. In a two stage implementation, only the first quantization error would be residual coded again. For lossy coding, quantization would be applied to the quantization error while for lossless coding, the last quantization error would be directly coded without lossy quantization. FIGS. 4a and 4b show the lossless coding case.

Figure 5:
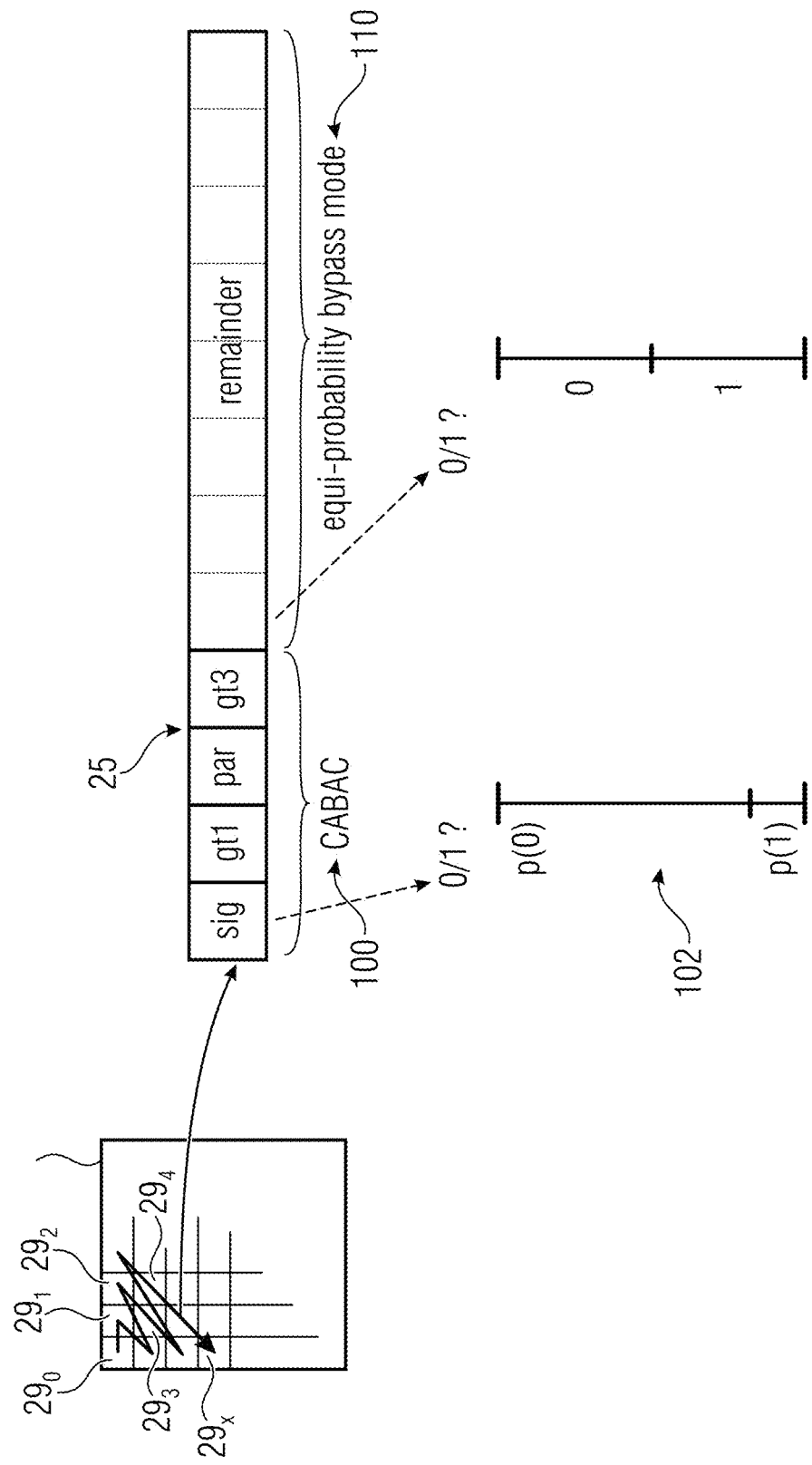
FIG. 5 shows a schematic view of a coding of a binarization, according to an embodiment.

The decoder 20 and the encoder 10 might be configured to decode the quantized prediction residual 24" and the at least one quantization error compensation signal 33 from/into the data stream 14, using context-adaptive binary entropy decoding/encoding 100 of a binarization of the quantized prediction residual 24" and the at least one quantization error compensation signal 33, as shown in FIG. 5.

For both, the quantized prediction residual 24" and the at least one quantization error compensation signal 33, the same binarization can be used.

FIG. 5 shows a possible coding of a possible binarization 25 of a value/sample/coefficient $29_4$ of the quantized prediction residual 24" or the at least one quantization error compensation signal 33.

A (optionally quantized) transform coefficient block 27 of the prediction residual or the at least one quantization error compensation signal might be parsed from an upper left coefficient $29_0$ to a last significant coefficient $29_x$ in one or more passes to obtain the binarization of the quantized prediction residual 24" and the at least one quantization error compensation signal 33. In each pass a certain number of bins are obtained. In a first pass, for example, only the significance bin (sig) is determined for the parsed values of the (optionally quantized) transform coefficient block 27, in a second pass, for example, the greater than 1 bin (gt1), the parity bin (par) and the greater than 3 bin (gt3) are determined and in a third pass, for example, the remainder bins are determined. It is clear that the (optionally quantized) transform coefficient block 27 can also be binarized differently.

According to an embodiment, having more than one residual coding stage corresponds to having at least two different binarizations of the residual signal, one for the quantized version, i.e. the quantized prediction residual, and one for the (optionally quantized) quantization error, i.e. the quantization error compensation signal 33. This results in different distributions of bins in each residual coding stage, which can be exploited in context modeling. Hence, with the same number of context coded bins CABAC (Context-Adaptive Binary Arithmetic Coding) 100 could better exploit statistical dependencies than in the one stage approach.

The context-adaptive binary entropy decoding/encoding 100 might be used to decode/encode leading bins, like the first four bins, like a sig bin, a gt1 bin, a par bin and a gt3 bin, of the binarization of the quantized prediction residual 24" and/or of the binarization of the at least one quantization error compensation signal 33. The remaining bins, i.e. the remainder, of the binarization of the quantized prediction residual 24" and/or of the binarization of the at least one quantization error compensation signal 33 might be decoded/encoded using an equi-probability bypass mode 110.

Different probability models 102 can be used to decode/encode the leading bins of the binarization of the quantized prediction residual 24" and/or of the binarization of the at least one quantization error compensation signal 33. According to an embodiment, the decoder 20/the encoder 10 might be configured to use first probability models for the decoding/encoding of the leading bins of the of the binarization of the quantized prediction residual 24" and second probability models for the decoding/encoding of the leading bins of the at least one quantization error compensation signal 33.

Alternatively, the decoder 20/the encoder 10 might be configured to select, for decoding 50/encoding 34 a predetermined bin, e.g., a first bin such as a significance bin (sig bin), of the leading bins of the binarization 25 of the quantized prediction residual 24", a first probability model out of a first set of probability models based on a function applied to previously decoded/encoded bins of the binarization of the quantized prediction residual 24" and, for decoding 50/encoding 34 a predetermined bin of the leading bins of the binarization of the at least one quantization error compensation signal 33, a second probability model out of a second set of probability models based on the function applied to previously decoded/encoded bins of the binarization of the at least one quantization error compensation signal 33. For example, a probability model 102 to decode/encode a significance bin associated with a currently decoded/encoded coefficient $29_4$ might be selected based on a function applied to previously decoded/encoded bins associated with coefficients $29_1$ to $29_3$ neighboring the currently decoded/encoded coefficient $29_4$.

The solution can be separated into four aspects, which are described in the following.

Aspect 1: Residual Coding of the Quantization Error

The generalized concept of the first aspect is depicted in FIG. 6a showing a multiple stage residual encoding for the encoder 10 and in FIG. 6b showing a multiple stage residual decoding for the decoder 20. Here the quantized input, i.e. the quantized prediction residual 24", to residual coding 34 is subtracted from the original input, i.e. a transformed prediction residual 24' in case of no transform skip and the prediction residual 24 in case of transform skip, to get the quantization error 120. In case of transform skip, the transform block 28 is skipped and for lossless, the last quantization block 32 is skipped as well.

The decoder 20/encoder 10 might be configured to decode 50/encode 34, from/into a data stream 14, a quantized prediction residual 24" and two or more quantization error compensation signals $33_1$-$33_{N-1}$ including a first quantized quantization error compensation signal $33_1'$ and a second quantization error compensation signal $33_2$. Thus, the second quantization error compensation signal $33_2$ might not be decoded/encoded in a quantized form resulting in a lossless coding. Alternatively, as shown in FIG. 6a and FIG. 6b, the two or more quantization error compensation signals $33_1$-$33_{N-1}$ include two or more quantized quantization error compensation signals $33_1'$-$33_{N-1}'$. If all quantization error compensation signals $33_1$-$33_{N-1}$ are decoded/encoded as quantized version, this may result in a lossy coding.

The first quantized quantization error compensation signal $33_1'$ is associated with a quantization error 1201 caused by a quantization $32_0$ of the prediction residual and the second quantization error compensation signal $33_2$ is associated with a quantization error $120_2$ caused by a quantization $32_1$ of the first quantization error compensation signal $33_1$, i.e. caused by a quantization $32_1$ of the quantization error $1201$ caused by the quantization $32_0$ of the prediction residual. The encoder 10 is configured to quantize $32_1$ the first quantization error compensation signal $33_1$ to obtain the first quantized quantization error compensation signal $33_1'$.

The decoder 20 is configured to scale $52_0$, i.e. dequantize, the quantized prediction residual 24'' to determine a scaled prediction residual 24'''. Additionally, the decoder 20 is configured to scale $52_1$ the first quantized quantization error compensation signal $33_1'$ to obtain a first scaled quantization error compensation signal $33_1''$ and determine the reconstructed prediction residual 24'''' based on the scaled prediction residual 24''', the first scaled quantization error compensation signal $33_1''$ and the second quantization error compensation signal $33_2$.

The second quantization error compensation signal $33_2$ might be used to correct the first scaled quantization error compensation signal $33_1''$, to obtain the first quantization error compensation signal $33_1$. The first quantization error compensation signal $33_1$, at decoder side, might represent a first reconstructed quantization error. The decoder 20 might be configured to correct the scaled prediction residual 24''' using the first quantization error compensation signal $33_1$ to obtain a corrected scaled prediction residual. This corrected scaled prediction residual might represent the reconstructed prediction residual 24'''' in case of skipping a transform block 54. Alternatively, the corrected scaled prediction residual might be subjected to the transform block 54 to obtain the reconstructed prediction residual 24''''.

In one embodiment, the present invention is applied in lossless coding as illustrated in FIGS. 7a and 7b. FIGS. 7a and 7b show a two stage lossless residual coding, wherein FIG. 7a shows an encoder embodiment and FIG. 7b shows a decoder embodiment.

In contrast to known lossless coding, at encoder 10 side, the residual signal, i.e. a prediction residual 14', is quantized 32 and the quantization error, i.e. a first quantization error compensation signal 33, is, for example, coded again with residual coding $34_2$. The quantization 32 might be performed using a predetermined quantizing factor. The residual coding $34_1$ of the quantized residual, i.e. a quantized prediction residual 24'', can be a specific residual coding for transform skip residuals as mentioned above [3]. The residual coding $34_2$ of the quantization error 33 can be the same as for the quantized residual 24'' for a simpler design or adapted to different signal properties to achieve a higher efficiency. For the quantization block 32, the quantization parameter can be determined based on a higher-level parameter such as the slice QP, or an offset to that parameter such as a delta QP for a subblock or a region of subblocks.

At the decoder 20 side, a quantized prediction residual 24'' is decoded 501 and scaled 52 to obtain a scaled prediction residual 24_a'''. Additionally, the decoder 20 is configured to decode $50_2$ a quantization error compensation signal 33 to correct the scaled prediction residual 24a''' and to determine a reconstructed prediction residual 24_b'''.

In another embodiment, the invention is applied to lossy coding with transform skip and two quantization stages $32_0/32_1$, at encoder 10 side, including quantization $32_1$ of the quantization error 33. Parallel, at decoder 20 side, two scaling stages $52_0/52_1$, including scaling $52_1$ a quantized quantization error compensation signal $33_1'$ to obtain a first scaled quantization error compensation signal $33_1''$ are used. Here again, the residual coding $34_2$ of the quantization error 33 can be the same as for the quantized residual 24'' for a simpler design or adapted to different signal properties to achieve a higher efficiency.

According to an embodiment, the decoder 20/encoder 10 described with regard to one of the FIGS. 4a to 7b is configured to decode/encode, from/into the data stream 14, a first scaling parameter, e.g., a first quantization parameter, for a scaling $52_0$ of the quantized prediction residual 24'', and further scaling parameters, e.g., further quantization parameter, for scalings $52_1$ to $52_{N-1}$ of quantized quantization error compensation signals $33_1'$ to $33_{N-1}'$, wherein each scaling parameter of the further scaling parameters is associated with a quantization/scaling stage $32_1$-$32_{N-1}/52_1$-$52_{N-1}$ of a quantized quantization error compensation signal $33_1'$ to $33_{N-1}'$.

Also the quantization parameter for the first block, i.e. the first scaling stage $52_0$, can be determined based on a higher-level parameter such as the slice QP, or an offset to that parameter such as a delta QP for a subblock or a region of subblocks. The quantization parameter for the second quantization block, i.e. the second scaling stage $52_1$, can be the same as the parameter of the first or previous quantization stage or an offset to the parameter of the first quantization stage, which is, for example:

fixed and/or signaled at video, sequence, picture or sub-picture level (e.g. slice or tile) and/or signaled for each subblock or region of subblocks and/or signaled for each subblock or region of subblocks as an index into a set of offset values signaled at video, sequence, picture or sub-picture level (e.g. slice or tile) and/or derived from neighboring subblocks or previously coded parameters In other words, the decoder 20/encoder 10 might be configured to decode/encode each of the further scaling parameters, from/into the data stream 14, or decode/encode an offset for each of the further scaling parameters to a scaling parameter associated with a previous quantization stage or decode/encode an offset for each of the further scaling parameters to the first scaling parameter associated with the first quantization stage $52_0$. This decoding/encoding of the first scaling parameter and optionally of the further scaling parameters can be performed at video, picture sequence, picture or sub-picture granularity.

Instead of the further scaling parameters, the decoder 20/encoder 10 might be configured to decode/encode a second scaling parameter usable at all scaling stages $52_1$-$52_{N-1}$ for a scaling of a quantized quantization error compensation signal $33_1'$ to $33_{N-1}'$. Thus, at all further scaling stages $52_1$-$52_{N-1}$ the same scaling parameter, i.e. the second scaling parameter, is used. The second scaling parameter differs from the first scaling parameter for a scaling $52_0$ of the quantized prediction residual 24''. According to an embodiment, the second scaling parameter is directly decoded/encoded or as offset to the first scaling parameter. This decoding/encoding of the second scaling parameter might as well be performed at video, picture sequence, picture or sub-picture granularity.

The decoder 20/encoder 10, according to FIG. 7b/FIG. 7a, might be configured to only decode/encode the first scaling parameter, since no further quantization/scaling stage is present. The quantization error compensation signal 33 is left unscaled.

Optionally, at the decoder 20/encoder 10, according to FIG. 6b/FIG. 6a, a predetermined quantization error compensation signal like a last quantization error compensation signal $33_{N-1}$ might be left unscaled/unquantized. This may be the case at the decoder 20, if this predetermined quantization error compensation signal is not a quantized quantization error compensation signal, i.e. the predetermined quantization error compensation signal is not quantized by the encoder 10. Thus, a predetermined scaling/quantization stage, e.g., the last scaling stage $52_{N-1}$ and the last quantization stage $32_{N-1}$, associated with the predetermined quantization error compensation signal is omitted.

According to an embodiment, the herein described at least one (optionally quantized) quantization error compensation signal is decoded/encoded using spatial and/or temporal prediction. For the temporal prediction, previously decoded/encoded portions of the at least one (optionally quantized) quantization error compensation signal might be used and for the spatial prediction previously decoded/encoded portions neighboring the at least one (optionally quantized) quantization error compensation signal might be used.

Figure 8:
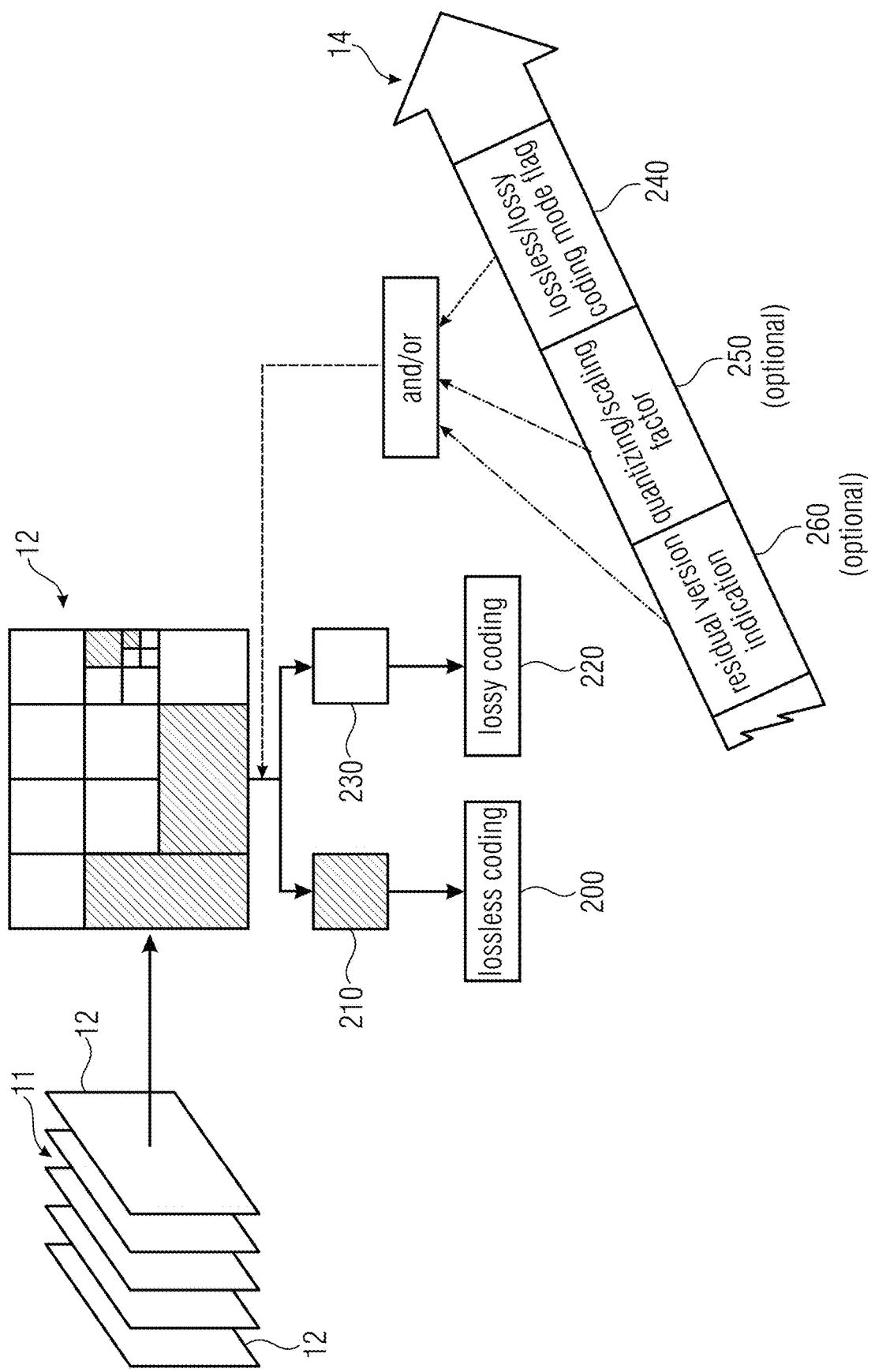
FIG. 8 shows a schematic view of an identification of lossless coded portions and lossy coded portions of a picture or video, according to an embodiment.

According to an embodiment, the herein described residual signal corresponds to a prediction of a picture 12 or a video 11. As shown in FIG. 8, an aforementioned encoder 10 might be configured to determine a lossless coding mode 200 for first portions 210 and a lossy coding mode 220 for second portions 230 of the picture 12 or the video 11, and an aforementioned decoder 20 might be configured to detect the lossless coding mode 200 for first portions 210 and the lossy coding mode 220 for second portions 230 of the picture 12 or the video 11.

The lossless coding mode 200 might be performed, as described with regard to FIGS. 7a and 7b. Alternatively, the lossless coding mode 200 may comprise two or more scaling/quantization stages 52/32, as described with regard to FIGS. 6a and 6b, wherein a last scaling/quantization stage $52_{N-1}/32_{N-1}$ is omitted, leaving the last quantization error compensation signal $33_{N-1}$ unscaled/unquantized.

The lossy coding mode 220 might be performed like one of the above described lossy coding modes 220. Alternatively, at the lossy coding mode 220, the prediction residual 24" is quantized 32 and encoded, into the data stream 14 and no quantization error compensation signal is encoded. Parallel, the decoder might be configured to decode, from the data stream 14, the quantized prediction residual and no quantization error compensation signal and scale the quantized prediction residual to determine the scaled prediction residual to obtain the reconstructed prediction residual.

A lossless/lossy coding mode flag 240 encoded into the data stream 14 may indicate for portions of the picture 12 or the video 11 whether the portions are to be decoded/encoded using the lossless coding mode 200 or the lossy coding mode 220. Based on the lossless/lossy coding mode flag 240 the decoder is configured to identify portions for which the lossless/lossy coding mode flag 240 indicates the lossless coding mode 200 as the first portions 210, and portions for which the loss-less/lossy coding mode flag 240 indicates the lossy coding mode 220 as the second portions 230.

According to an embodiment, a quantizing/scaling factor 250, e.g. a first quantizing factor, i.e. a first scaling factor, or a predetermined quantizing factor, i.e. a predetermined scaling factor, is encoded, into the data stream 14, for portions of the picture 12 or the video 11. Portions for which the quantizing/scaling factor 250 corresponds to no quantization form the first portions 210, and portions for which the quantizing/scaling factor 250 does not correspond to no quantization form the second portions 230. The decoder might be configured to identify the first portions 200 and the second portions 230 based on the quantizing/scaling factor 250.

Optionally the decoder/encoder is configured to decode/encode, from/into the data stream 14, an indication 260 whether the residual signal is coded into the data stream 14 in transform domain or non-transform domain. According to an embodiment, portions for which the quantizing/scaling factor 250 corresponds to no quantization and the residual signal is encoded into the data stream 14 in the non-transform domain form the first portions 210, and portions for which the quantizing/scaling factor 250 does not correspond to no quantization and the residual signal is encoded into the data stream in transform domain form the second portions 230. In other words, the prediction residual of the first portions 210 does not undergo a transformation 28/54 and a quantization 32/scaling 52 but the prediction residual of the second portions 230 does undergo a transformation 28/54 and a quantization 32/scaling 52.

Aspect 2: Prediction of the Quantization Error

The second aspect extends the first aspect by adding prediction to the quantization error, i.e. the quantization error compensation signal 33. The prediction can be calculated at the decoder as well. Consequently, only the prediction error of the quantization error is, for example, coded and decoded. For each quantization error a prediction error might be calculated. The prediction error might be obtained by using at least one error prediction signal predicted using a prediction type and the prediction error might be determined based on the error prediction signal and the at least one quantization error. Since the prediction is lossless, it can be applied to lossy transform and transform skip as well as lossless coding.

According to an embodiment, the decoder 20/encoder 10 is configured to derive/encode, from/into the data stream 14, e.g., for each quantization error, an assignment of a prediction error of the respective quantization error to a set of prediction types, so that a prediction error of the respective quantization error is assigned to an associated prediction type out of the set of prediction types.

The at least one quantization error compensation signal might be determined based on the prediction errors and the for each prediction error corresponding error prediction signal.

Aspect 3: Signalling

The multistage mode can be signalled in different ways:
Explicitly signalled at video, sequence, picture or sub-picture level (e.g. slice or tile) and/or
If enabled explicitly signalled at subblock or region of subblocks level and/or
Implicitly enabled for lossless coding or transform skip coding.

In one embodiment, lossless coding would be signalled on a subblock level by explicitly signalling that transform is skipped and by signalling a quantization parameter that results in skipping the quantization. In case lossless coding is signalled, the two stage residual coding for lossless as described in one embodiment of the first aspect is applied.

Aspect 4: Separate Coding of the Quantization Error

This fourth aspect includes coding the quantization error separately for a video, sequence, picture or sub-picture level (e.g. slice or tile), i.e. outside the coding loop. This way, quality scalability can be enabled for lossy coding by coding the quantized quantization error in a separate, enhancement layer. For lossless coding, a separate layer with the coded quantization error can be used as an enhancement layer to a lossy base layer.

According to an embodiment, the decoder 20/encoder 10 is configured to decode 50/encode 34 the quantized prediction residual from/into a lossy base layer of the data stream 14 and decode 50/encode 34 the at least one quantization error compensation signal 33 from/into an enhancement layer of the data stream 14.

Implementation Alternatives:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ITU-T, Recommendation H.265 and ISO/IEC, Int. Standard 23008-2, "High efficiency video coding," Geneva, Switzerland, February 2018. Online: http://www.itu.int/rec/T-REC-H.265.

[2] T. Nguyen, B. Bross, H. Schwarz, D. Marpe, and T. Wiegand, "Minimum Allowed QP for Transform Skip Mode," Joint Video Experts Group, document JVET-O0405, Gothenburg, July 2019. Online: http://phenix.it-sudparis.eu/jvet/doc_end_user/docum ents/15_Gothenburg/wg11/JVET-O0405-v1 zip

[3] B. Bross, T. Nguyen, P. Keydel, H. Schwarz, D. Marpe, and T. Wiegand, "NonCE8: Unified Transform Type Signalling and Residual Coding for Transform Skip," Joint Video Experts Group, document JVET-M0464, Marrakech, January 2019. Online: http://phenix.itsudparis.eu/jvet/doc_end_user/documents/13_Marrakech/wg11/JVET-M0464-v4.zip

The invention claimed is:

1. A decoder for decoding a residual signal from a data stream, configured to
  decode, from the data stream, a quantized prediction residual and at least one quantization error compensation signal;
  scale the quantized prediction residual to determine a scaled prediction residual;
  determine a reconstructed prediction residual based on the scaled prediction residual and the at least one quantization error compensation signal;

wherein the decoder is implemented using a microprocessor, a programmable computer and/or an electronic circuit.

2. The decoder according to claim 1, wherein the decoder is configured to decode the quantized prediction residual and the at least one quantization error compensation signal from the data stream, using context-adaptive binary entropy decoding of a binarization of the prediction residual and the at least one quantization error compensation signal.

3. The decoder according to claim 2, wherein the decoder is configured to use the context-adaptive binary entropy decoding to decode leading bins of the binarization of the prediction residual context-adaptively and to use an equi-probability bypass mode to decode remaining bins of the binarization of the prediction residual; and/or
wherein the decoder is configured to use the context-adaptive binary entropy decoding to decode leading bins of the binarization of the at least one quantization error compensation signal and to use an equi-probability bypass mode to decode remaining bins of the binarization of the at least one quantization error compensation signal.

4. The decoder according to claim 3, wherein the decoder is configured to use the same binarization for the prediction residual and the at least one quantization error compensation signal and use first probability models for the decoding of the leading bins of the binarization of the prediction residual and second probability models for the decoding of the leading bins of the at least one quantization error compensation signal.

5. The decoder according to claim 3, wherein the decoder is configured to
use the same binarization for the prediction residual and the at least one quantization error compensation signal and
select, for the decoding a predetermined bin of the leading bins of the binarization of the prediction residual, a first probability model out of a first set of probability models based on a function applied to previously decoded bins of the binarization of the prediction residual and, for the decoding a predetermined bin of the leading bins of the binarization of the at least one quantization error compensation signal, a second probability model out of a second set of probability models based on the function applied to previously decoded bins of the binarization of the at least one quantization error compensation signal.

6. The decoder according to claim 1, wherein the decoder is configured to decode, from the data stream, two or more quantization error compensation signals,
comprising at least a first quantized quantization error compensation signal associated with a quantization error caused by a quantization of the prediction residual, and
a second quantization error compensation signal associated with a quantization error caused by a quantization of a first quantization error compensation signal.

7. The decoder according to claim 6, wherein the decoder is configured to scale the first quantized quantization error compensation signal to acquire a first scaled quantization error compensation signal and determine the reconstructed prediction residual based on the scaled prediction residual, the first scaled quantization error compensation signal and the second quantization error compensation signal.

8. The decoder according to claim 6, wherein the decoder is configured to decode, from the data stream, a first scaling parameter for a scaling of the quantized prediction residual, and further scaling parameters for scalings of quantized quantization error compensation signals, wherein each scaling parameter of the further scaling parameters is associated with a quantization stage.

9. The decoder according to claim 8, wherein the decoder is configured to decode each of the further scaling parameters, from the data stream, or decode an offset for each of the further scaling parameters to a scaling parameter associated with a previous quantization stage at video, picture sequence, picture or sub-picture granularity.

10. The decoder according to claim 1, wherein the decoder is configured to decode, from the data stream, a first scaling parameter for the scaling of the quantized prediction residual and a second scaling parameter for a scaling of the at least one quantization error compensation signal.

11. The decoder according to claim 10, configured to decode the second scaling parameter as an offset to the first scaling parameter.

12. The decoder according to claim 10, configured to decode the second scaling parameter or an offset of the second scaling parameter to the first scaling parameter at video, picture sequence, picture or sub-picture granularity.

13. The decoder according to claim 1, configured to leave a predetermined quantization error compensation signal of the at least one quantization error compensation signals unscaled.

14. The decoder according to claim 1, wherein
the residual signal corresponds to a prediction of a picture or a video, and
the decoder is configured to
detect a lossless coding mode for first portions and a lossy coding mode for second portions of the picture or video, and
for the first portions,
decode, from the data stream, the quantized prediction residual and the at least one quantization error compensation signal;
scale the quantized prediction residual using a predetermined scaling factor to determine the scaled prediction residual, and leave the at least one quantization error compensation signal unscaled;
determine the reconstructed prediction residual based on the scaled prediction residual and the at least one quantization error compensation signal, and
for the second portions,
decode, from the data stream, the quantized prediction residual without the at least one quantization error compensation signal; and
scale the quantized prediction residual using a first scaling factor signaled in the data stream for the second portions to determine the scaled prediction residual to acquire the reconstructed prediction residual.

15. The decoder of claim 14, configured to
decode from the data stream a lossless/lossy coding mode flag for portions of the picture or video,
identify portions for which the lossless/lossy coding mode flag indicates the lossless coding mode as the first portions, and portions for which the lossless/lossy coding mode flag indicates the lossy coding mode as the second portions.

16. The decoder of claim 14, configured to
decode from the data stream the first scaling factor for portions of the picture or video,
identify portions for which the first scaling factor corresponds to no scaling as the first portions, and portions for which the first scaling factor does not correspond to no scaling as the second portions.

17. The decoder according to claim 14, wherein the decoder is configured to use a fixed predetermined scaling factor or acquire the predetermined scaling factor by applying an offset to the first scaling factor or decode the predetermined scaling factor from the data stream.

18. The decoder according to claim 14, configured to
decode from the data stream for portions of the data stream the first scaling factor and an indication whether the residual signal is coded into the data stream in transform domain or non-transform domain,
identify portions for which the first scaling factor corresponds to no scaling and the residual signal is coded into the data stream in the non-transform domain as the first portions, and portions for which the first scaling factor does not correspond to no scaling and the residual signal is coded into the data stream in transform domain as the second portions.

19. The decoder according to claim 1, for decoding a picture from a data stream, configured to
predict the picture using intra prediction and/or inter prediction so as to acquire a prediction signal;
wherein the reconstructed prediction residual relates to the prediction signal of the picture within a predetermined block of the picture; and
reconstruct the predetermined block of the picture using the reconstructed prediction residual and the prediction signal.

20. The decoder according to claim 1, configured to decode the at least one quantization error compensation signal using spatial and/or temporal prediction.

21. The decoder according to claim 1, configured to decode the at least one quantization error compensation signal using spatial and/or temporal prediction from neighboring and/or previously decoded portions of the at least one quantization error compensation signal.

22. The decoder according to claim 1, configured to
decode, from the data stream, at least one prediction error of a quantization error, wherein the decoder is configured to derive, from the data stream, an assignment of the at least one prediction error of a quantization error to a set of prediction types, so that each prediction error of a quantization error is assigned to an associated prediction type out of the set of prediction types;
acquire, for the at least one prediction error of a quantization error, at least one error prediction signal using the prediction type assigned to the respective prediction error of a quantization error;
and determine the at least one quantization error compensation signal based on the at least one prediction error of a quantization error and the at least one error prediction signal.

23. The decoder according to claim 1, wherein the decoder is configured to decode the quantized prediction residual from a lossy base layer of the data stream and decode the at least one quantization error compensation signal from an enhancement layer of the data stream.

24. An encoder for encoding a residual signal into a data stream, configured to
quantize a prediction residual to determine, with a quantization error, a quantized prediction residual;
determine at least one quantization error compensation signal for compensating the quantization error
encode, into the data stream, the quantized prediction residual and the at least one quantization error compensation signal.

25. A method for decoding a residual signal from a data stream, comprising
decoding, from the data stream, a quantized prediction residual and at least one quantization error compensation signal;
scaling the quantized prediction residual to determine a scaled prediction residual; and
determining a reconstructed prediction residual based on the scaled prediction residual and the at least one quantization error compensation signal.

26. A method for encoding a residual signal into a data stream, comprising
quantizing a prediction residual to determine, with a quantization error, a quantized prediction residual;
determining at least one quantization error compensation signal for compensating the quantization error
encoding, into the data stream, the quantized prediction residual and the at least one quantization error compensation signal.

27. A data stream having a picture encoded thereinto using a method for encoding a residual signal into a data stream, the method comprising
quantizing a prediction residual to determine, with a quantization error, a quantized prediction residual;
determining at least one quantization error compensation signal for compensating the quantization error
encoding, into the data stream, the quantized prediction residual and the at least one quantization error compensation signal.

* * * * *